(12) United States Patent
Inoshita

(10) Patent No.: US 11,537,814 B2
(45) Date of Patent: Dec. 27, 2022

(54) DATA PROVIDING SYSTEM AND DATA COLLECTION SYSTEM

(71) Applicant: NEC CORPORATION, Tokyo (JP)

(72) Inventor: Tetsuo Inoshita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 237 days.

(21) Appl. No.: 17/053,587

(22) PCT Filed: May 7, 2018

(86) PCT No.: PCT/JP2018/017609
§ 371 (c)(1),
(2) Date: Nov. 6, 2020

(87) PCT Pub. No.: WO2019/215778
PCT Pub. Date: Nov. 14, 2019

(65) Prior Publication Data
US 2021/0232862 A1 Jul. 29, 2021

(51) Int. Cl.
*G06K 9/62* (2022.01)
*G06N 20/00* (2019.01)
*G06V 20/20* (2022.01)

(52) U.S. Cl.
CPC .......... *G06K 9/6256* (2013.01); *G06N 20/00* (2019.01); *G06V 20/20* (2022.01)

(58) Field of Classification Search
None
See application file for complete search history.

(56) References Cited

U.S. PATENT DOCUMENTS

| | | | |
|---|---|---|---|
| 2016/0098636 A1* | 4/2016 | Okonogi | G06N 20/00 706/12 |
| 2018/0075360 A1* | 3/2018 | Tanimoto | G06N 20/00 |
| 2021/0133495 A1* | 5/2021 | Inoshita | G06N 20/00 |
| 2021/0224537 A1* | 7/2021 | Inoshita | G06N 3/0454 |

FOREIGN PATENT DOCUMENTS

| | | |
|---|---|---|
| JP | 11-341210 A | 12/1999 |
| JP | 2009-005314 A | 1/2009 |
| JP | 2016-76073 A | 5/2016 |
| JP | 2017-117139 A | 6/2017 |
| WO | 2010/047019 A1 | 4/2010 |
| WO | 2016/152053 A1 | 9/2016 |

OTHER PUBLICATIONS

International search report for PCT/JP2018/017609 dated Jul. 24, 2018.
Japanese Office Action for JP Application No. 2020-517630 dated Oct. 12, 2021 with English Translation.

* cited by examiner

*Primary Examiner* — Dov Popovici
(74) *Attorney, Agent, or Firm* — Sughrue Mion, PLLC

(57) ABSTRACT

Identification means 71 identifies an object indicated by data by applying the data to a model learned by machine learning. Determination means 72 determines whether or not the data is transmission target data to be transmitted to a predetermined computer based on a result obtained by applying the data to the model. Data transmission means 73 transmits the data determined to be the transmission target data to the predetermined computer at a predetermined timing.

13 Claims, 16 Drawing Sheets

| | IDENTIFICATION RESULT, | RELIABILITY |
|---|---|---|
| IMAGE, | AUTOMOBILE, | 0.6 |

FIG. 7

IMAGE, IDENTIFICATION RESULT, RELIABILITY, INPUT LABEL, COORDINATES OF RECTANGULAR REGION

MOTORCYCLE, 0.6, AUTOMOBILE, (x1, y1), (x2, y2), (x3, y3), (x4, y4)

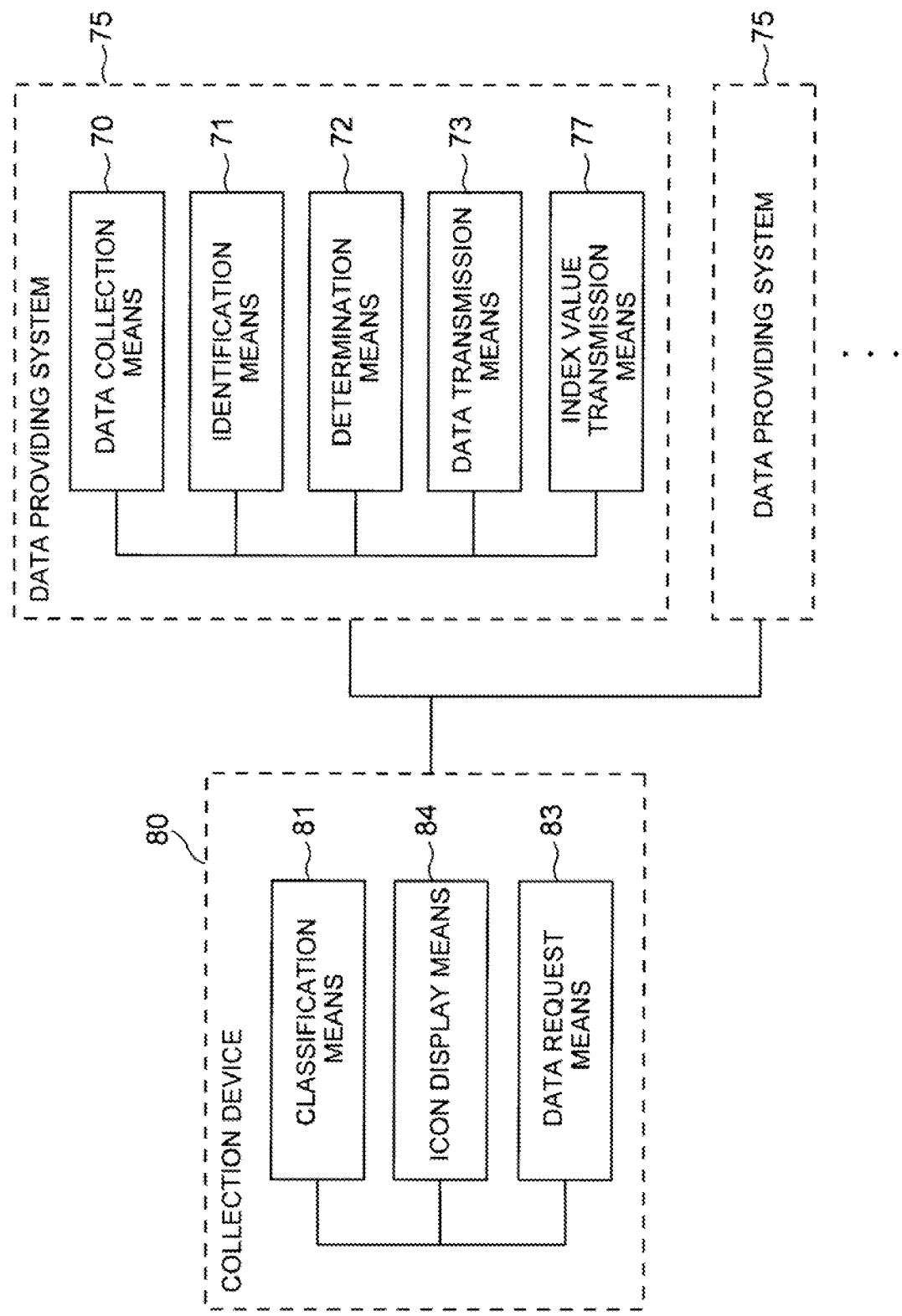

DATA PROVIDING SYSTEM AND DATA COLLECTION SYSTEM

CROSS-REFERENCE TO RELATED APPLICATIONS

This application is a National Stage of International Application No. PCT/JP2018/017609 filed May 7, 2018.

TECHNICAL FIELD

The present invention relates to a data providing system, a data providing method, and a data providing program for providing data to a predetermined computer, and a data collection system and a data collection method for collecting data from a plurality of data providing systems.

BACKGROUND ART

An example of a general identification system is described below. In the general identification system, a model is learned in advance by machine learning by using a group of an image captured by a camera included in the identification system and a label indicating an object appearing in the image as training data. The general identification system identifies the object appearing in the image by applying an image newly captured by the camera to the model.

Such a general identification system is used for preventing crimes in advance by detecting suspicious vehicles or suspicious persons, or is used for supporting a user of a white cane or a wheelchair by detecting and guiding the user of the white cane or the wheelchair.

Although the identification system that identifies the object appearing in the image has been described as an example, an identification system that identifies an object indicated by audio data is considered as the general identification system. Hereinafter, the identification system that identifies the object appearing in the image will be described as an example.

PTL 1 describes a system that includes learning data storage means for storing learning data necessary for learning a statistical model and preliminary data storage means for storing data collected separately from the data stored in the learning data storage means. PTL 1 describes that the system selects data of which a value of an information amount is lower than a predetermined threshold value.

PTL 2 describes a data communication device that displays a transmission instruction button for determining a transmission instruction to determine transmission of data to a Facsimile (FAX) number on an operation display device.

PTL 3 describes a FAX-optical character recognition (OCR) device that counts a recognition rate.

CITATION LIST

Patent Literature

PTL 1: International Publication No. 2010/047019
PTL 2: Japanese Patent Application Laid-Open No. 2009-5314
PTL 3: Japanese Patent Application Laid-Open No. 11-341210

SUMMARY OF INVENTION

Technical Problem

It is considered that the above-mentioned general identification system is provided in plural and the camera of each identification system is installed at each location.

Here, there are some cases where the appearance of the objects in the images captured by one camera varies. For example, it is assumed that one camera has many opportunities to capture automobiles traveling in a direction from a right side to a left side as viewed from the camera but has little opportunity to capture automobiles traveling in the opposite direction. In this case, many images on which the automobiles traveling in the direction from the right side to the left side appear are obtained, but few images on which the automobiles traveling in the opposite direction appear are obtained. Thus, the training data includes many images on which the automobiles traveling in the direction from the right side to the left side appear and includes only few images on which the automobiles traveling in the opposite direction appear. As a result, the identification system identifies the automobile with high accuracy when an image on which the automobile traveling in the direction from the right side to the left side appears is applied to the model obtained by machine learning using the training data, but has low identification accuracy of the automobile when an image on which the automobile traveling in the opposite direction appears is applied to the model.

There are some cases where a new identification system is provided and a camera of the identification system is installed at a new location. In this case, when it is possible to collect images for which high identification accuracy is not obtained in each existing identification system, it is possible to collect various images, and it is possible to reduce the variation in the appearance of the objects in the images. Thus, when a model is generated by machine learning by using the various images as the training data, a model with high versatility and high identification accuracy can be obtained. This model can be used to generate a model to be used in the newly provided identification system.

Accordingly, an object of the present invention is to provide a data providing system, a data providing method, a data providing program, a data collection system, and a data collection method capable of easily collecting data that can contribute to generation of a model with high identification accuracy.

Solution to Problem

A data providing system according to the present invention includes identification means for identifying an object indicated by data by applying the data to a model learned by machine learning, determination means for determining whether or not the data is transmission target data to be transmitted to a predetermined computer based on a result obtained by applying the data to the model, and data transmission means for transmitting the data determined to be the transmission target data to the predetermined computer at a predetermined timing.

A data providing system according to the present invention includes identification means for identifying an object indicated by data by applying the data to a model learned by machine learning, determination means for determining whether or not the data is transmission target data to be transmitted to a predetermined computer based on a result obtained by applying the data to the model, data transmission means for transmitting the data determined to be the transmission target data to the predetermined computer, and display control means for displaying a button for inputting a data transmission instruction and an index value indicating identification accuracy of the model. The data transmission means transmits each data determined to be the transmission target data to the predetermined computer at a timing at which the button is clicked by an operator.

A data collection system according to the present invention includes a plurality of data providing systems, and a collection device that collects data from the plurality of data providing systems. Each of the individual data providing systems includes data collection means for collecting data at an installation location, identification means for identifying an object indicated by the data collected by the data collection means by applying the data to a model learned by machine learning, determination means for determining whether or not the data is transmission target data to be transmitted to the collection device based on a result obtained by applying the data to the model, and data transmission means for transmitting the data determined to be the transmission target data to the collection device. The collection device includes classification means for classifying the data providing systems into a plurality of groups based on an attribute of the data collection means of each of the individual data providing systems, selection means for selecting the data providing systems from each group when an operator of the collection device performs a predetermined operation, and data request means for transmitting a data transmission request to each of the data providing systems selected by the selection means, and wherein the data transmission means of each of the individual data providing systems transmits each data determined to be the transmission target data to the collection device at a timing at which the transmission request is received from the collection device.

A data collection system according to the present invention includes a plurality of data providing systems, and a collection device that collects data from the plurality of data providing systems. Each of the individual data providing systems includes data collection means for collecting data at an installation location, identification means for identifying an object indicated by the data collected by the data collection means by applying the data to a model learned by machine learning, determination means for determining whether or not the data is transmission target data to be transmitted to the collection device based on a result obtained by applying the data to the model, data transmission means for transmitting the data determined to be the transmission target data to the collection device, and index value transmission means for transmitting an index value indicating identification accuracy of the model to the collection device. The collection device includes classification means for classifying the data providing systems into a plurality of groups based on an attribute of the data collection means of each of the individual data providing systems, icon display means for displaying icons indicating the individual data providing systems in different modes for the groups, and displaying the index value received from the data providing system indicated by the icon in the vicinity of each of the individual icons, and data request means for transmitting, when the icon is clicked by an operator of the collection device, a data transmission request to the data providing system indicated by the clicked icon. The data transmission means of each of the individual data providing systems transmits each data determined to the transmission target data to the collection device at a timing at which the transmission request is received from the collection device.

A data providing method according to the present invention includes identifying an object indicated by data by applying the data to a model learned by machine learning, determining whether or not the data is transmission target data to be transmitted to a predetermined computer based on a result obtained by applying the data to the model, and transmitting the data determined to be the transmission target data to the predetermined computer at a predetermined timing.

A data collection method according to the present invention is a data collection method applied to a data collection system that includes a plurality of data providing systems each including data collection means for collecting data at an installation location and a collection device collecting data from the plurality of data providing systems. The data collection method includes identifying, by each of the individual data providing systems, an object indicated by the data collected by the data collection means by applying the data to a model learned by machine learning, determining, by each of the individual data providing systems, whether or not the data is transmission target data to be transmitted to the collection device based on a result obtained by applying the data to the model, classifying, by the collection device, the data providing systems into a plurality of groups based on an attribute of the data collection means of each of the individual data providing systems, selecting, by the collection device, the data providing systems from each group when an operator of the collection device performs a predetermined operation, transmitting, by the collection device, a data transmission request to each of the selected data providing systems, and transmitting, by each of the individual data providing systems, each data determined to be the transmission target data to the collection device at a timing at which the transmission request is received from the collection device.

A data providing program according to the present invention causes a computer to execute identification processing of identifying an object indicated by data by applying the data to a model learned by machine learning, determination processing of determining whether or not the data is transmission target data to be transmitted to a predetermined computer based on a result obtained by applying the data to the model, and data transmission processing of transmitting the data determined to be the transmission target data to the predetermined computer at a predetermined timing.

Advantageous Effects of Invention

According to the present invention, it is possible to easily collect data that can contribute to generation of a model with high identification accuracy.

BRIEF DESCRIPTION OF DRAWINGS

FIG. 7 It depicts a schematic diagram illustrating an example of the result of the identification processing stored in the data storage unit 112 by the identification unit and information added by the label reception unit.

FIG. 20 It depicts a block diagram illustrating another example of the outline of the data collection system of the present invention.

DESCRIPTION OF EMBODIMENTS

Hereinafter, exemplary embodiments of the present invention will be described with reference to the drawings.

First Exemplary Embodiment

Figure 1:
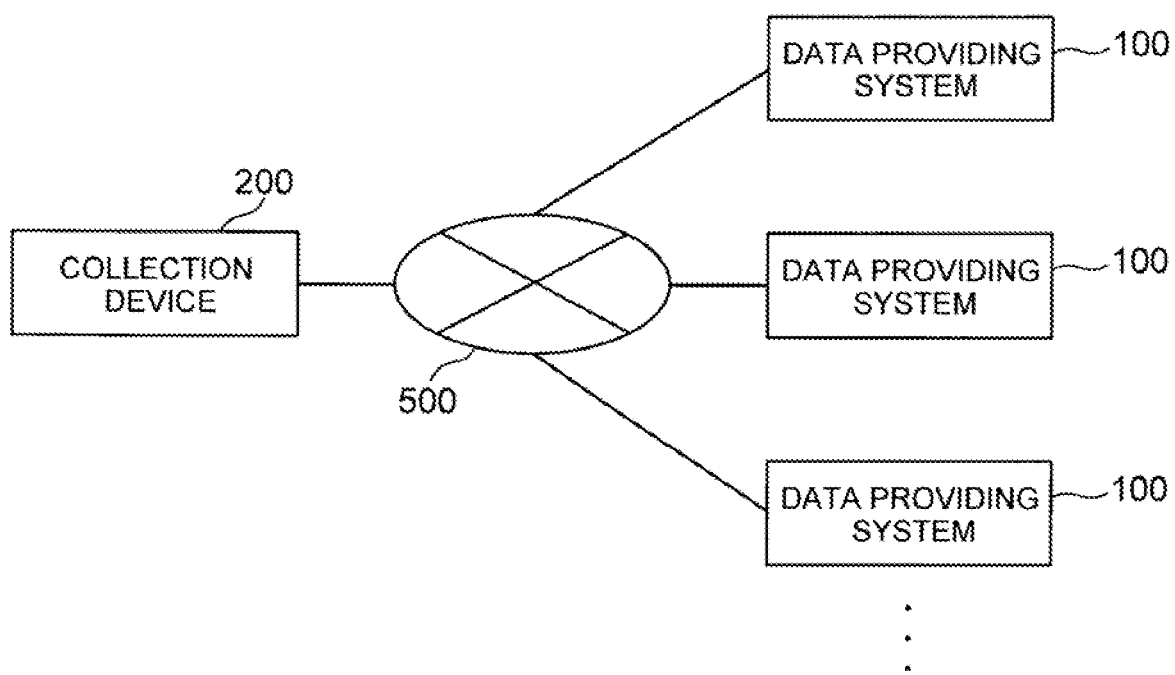
FIG. 1 It depicts a schematic diagram illustrating a data providing system of the present invention and a collection device that collects data from the data providing system.

FIG. 1 is a schematic diagram illustrating a data providing system of the present invention and a collection device that collects data from the data providing system. In the example illustrated in FIG. 1, a plurality of data providing systems 100 is provided. A collection device 200 and the plurality of data providing systems 100 can be collectively referred to as a data collection system. The collection device 200 and the plurality of data providing systems 100 are connected so as to be able to communicate with each other via a communication network 500. The plurality of data providing systems 100 has the same configuration.

Each of the individual data providing systems 100 includes a data collection unit (a data collection unit 101 illustrated in FIG. 2 to be described later). The data collection unit (not illustrated in FIG. 1; see FIG. 2 to be described later) of each data providing system 100 is installed at each location at which data is collected. The data collection unit collects data at the installation location of the data collection unit. For example, the data collection unit collects image and audio data at the installation location. The data collection unit is realized by a camera or a microphone. For example, the data collection unit may collect the image by capturing a surveillance location. For example, the audio data may be collected by recording audio at the installation location.

Each of the individual data providing systems 100 includes a computer separately from the data collection unit, and the computer identifies an object indicated by the data (the image, the audio data, or the like). Accordingly, the data providing system 100 can also be referred to as an identification system.

Each data providing system 100 transmits data satisfying a predetermined condition to the collection device 200, and the collection device 200 receives the data transmitted from each data providing system 100 and accumulates the received data.

Figure 2:
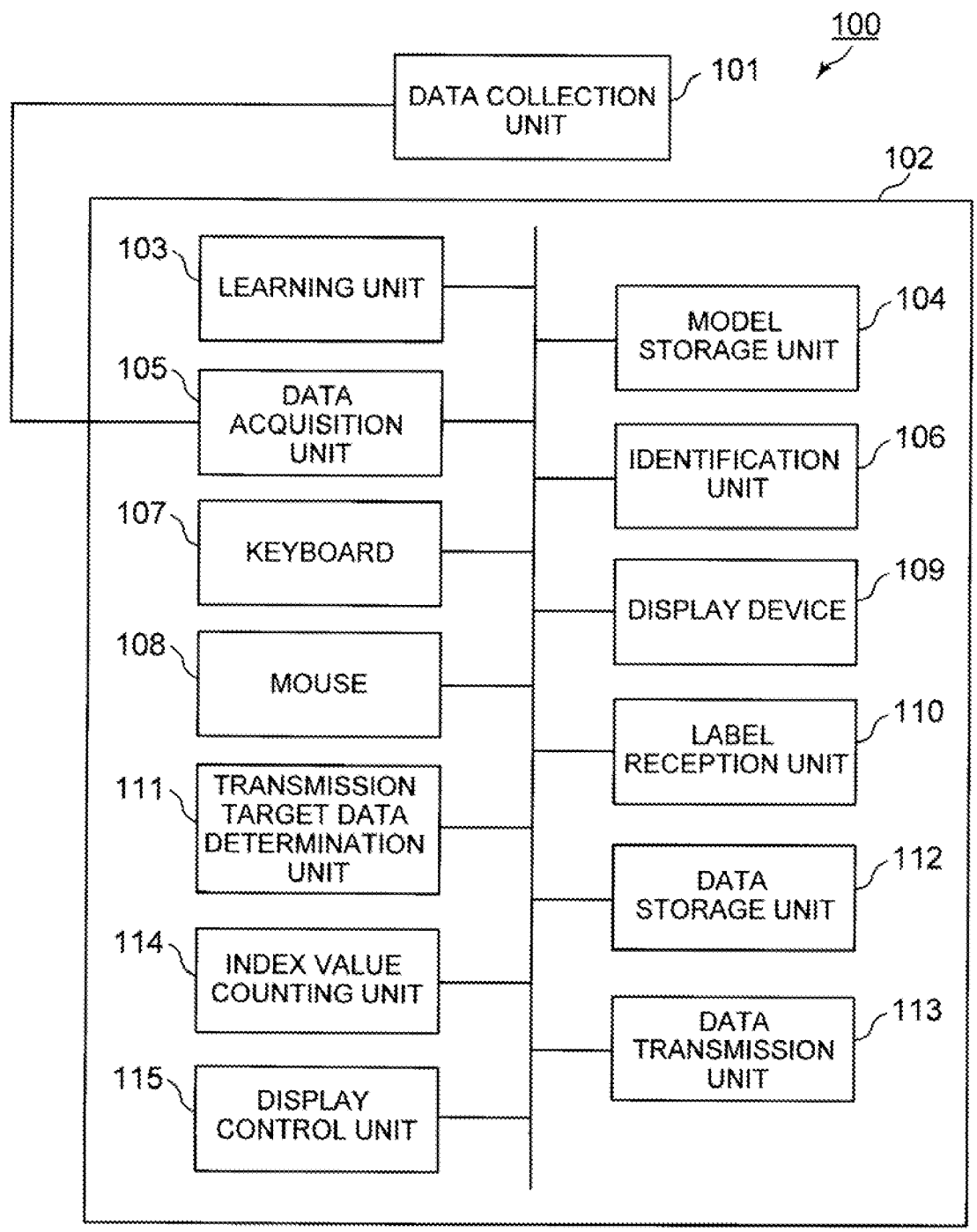
FIG. 2 It depicts a block diagram illustrating a configuration example of a data providing system according to a first exemplary embodiment.

FIG. 2 is a block diagram illustrating a configuration example of the data providing system 100 according to the first exemplary embodiment. The plurality of data providing systems 100 illustrated in FIG. 1 has the same configuration, and the configuration of each data providing system 100 can be represented as illustrated in FIG. 2. The data providing system 100 includes the data collection unit 101 and a computer 102. The data collection unit 101 and the computer 102 are connected in a wired or wireless manner so as to be able to communicate with each other. In the following description, a case where the data collection unit 101 is a camera will be described as an example, and the data collection unit 101 will be referred to as a camera 101. The camera 101 performs capturing at the installation location of the camera 101. The installation location of the camera 101 and the installation location of the computer 102 may be different from each other.

The computer 102 includes a learning unit 103, a model storage unit 104, a data acquisition unit 105, an identification unit 106, a keyboard 107, a mouse 108, a display device 109, a label reception unit 110, and a transmission target data determination unit 111, a data storage unit 112, a data transmission unit 113, an index value counting unit 114, and a display control unit 115.

The learning unit 103 learns a model by machine learning by using the image captured by the camera 101 as training data. Hereinafter, a case where the learning unit 103 learns a model by deep learning will be described as an example. The training data is, specifically, a set of groups of an image captured by the camera 101, a label indicating the object appearing in the image, and coordinates indicating the rectangular region surrounding the object in the image (for example, coordinates of each vertex of the rectangular region). The label and the rectangular region surrounding the object in the image may be determined by an operator of the data providing system 100. The learning unit 103 learns (generates) the model by using such a set of groups as the training data.

This model is a model for identifying an object appearing in a given new image. Hereinafter, a case where this model is a model for determining whether the object appearing in the image is an "automobile", a "motorcycle", a "bus", or a "background (that is, the automobile, the motorcycle, or the bus does not appear)" will be described. When such a model is learned, the operator determines, as the label, any one of the "automobile", the "motorcycle", the "bus", and the "background" for each image. Although a case where the identification unit 106 (see FIG. 2) to be described later determines whether the object appearing in the image is the "automobile", the "motorcycle", the "bus", or the "background" by using the model will be described in each exemplary embodiment, targets to be determined by using the model are not limited to the "automobile", the "motorcycle", the "bus", and the "background". The operator may prepare training data corresponding to the purpose of identification processing, and may cause the learning unit 103 to learn the model by using the training data.

The learning unit 103 stores the model generated by deep learning in the model storage unit 104. The model storage unit 104 is a storage device that stores the model.

Figure 3:
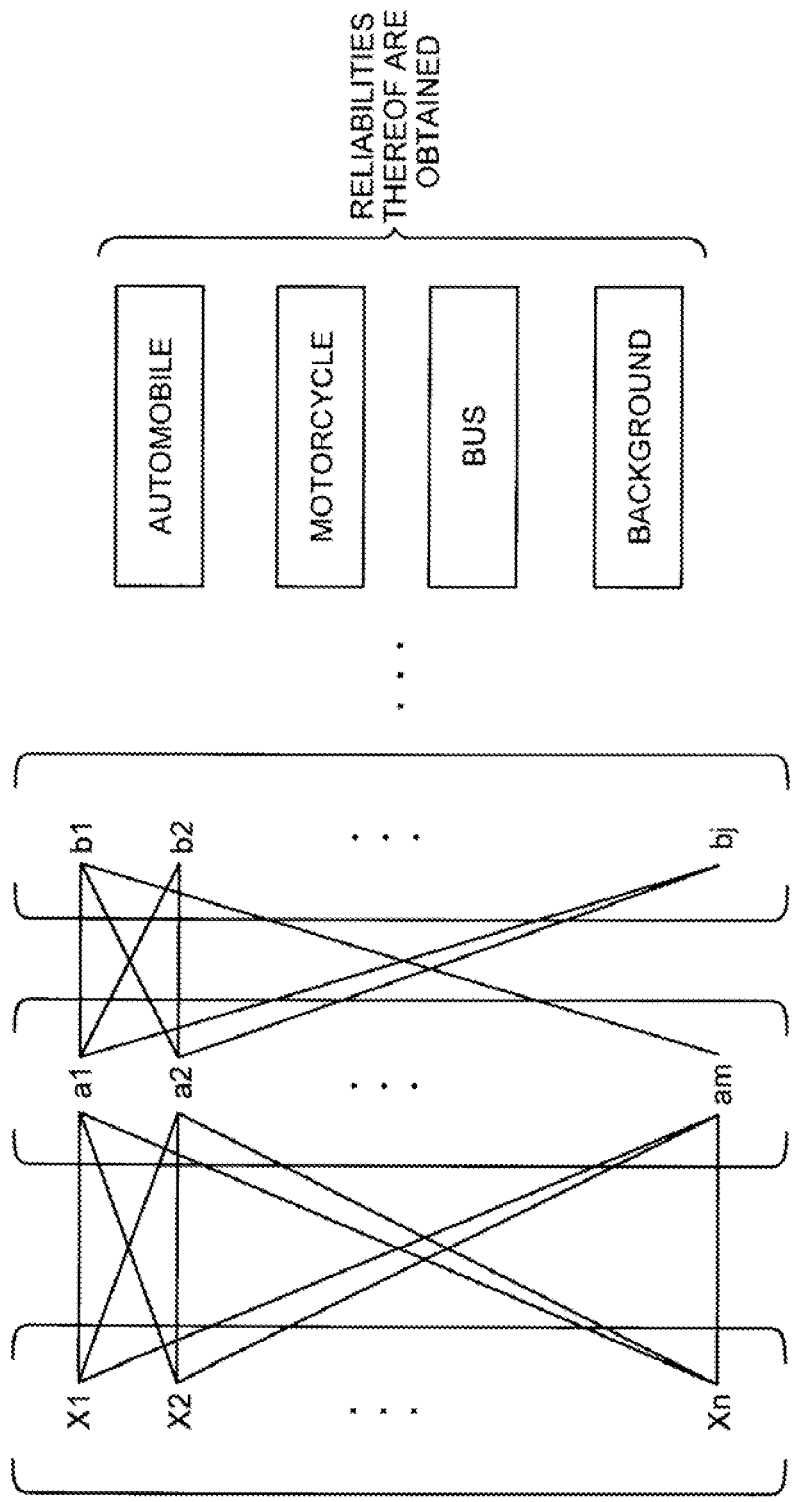
FIG. 3 It depicts a schematic diagram illustrating an example of a model generated by a learning unit.

FIG. 3 is a schematic diagram illustrating an example of the model generated by the learning unit 103. When the number of pixels of the image to be applied to the model is n, the image can be represented as a vector $(X1, X2, \ldots, Xn)^T$ having pixel values of n pixels as elements. For example, X1 represents a pixel value of a first pixel in the image. The same applies to X2 to Xn. Here, T means a transposition. The model has a plurality of layers, and includes a plurality of coefficients for each layer. In the example illustrated in FIG. 3, a first layer includes coefficients a1 to am, and a second layer includes coefficients b1 to bj. The individual elements X1 to Xn of the vector representing the image are associated with the respective coefficients a1 to am of the first layer. In FIG. 3, this association is represented by lines. The respective coefficients of a certain layer are associated with the coefficients of the next layer. In FIG. 3, this association is also represented by lines. Weights are determined between the associated elements. For example, the weights are respectively assigned to the associated a1 and b1, the associated a1 and b2, and the like.

The learning unit 103 determines the number of layers, the number of coefficients included in each layer, the value of each of the individual coefficients of each layer, and the value of the weight between the associated elements by performing deep learning by using the training data. The determination of these values corresponds to the generation of the model.

Processing of learning, by the learning unit 103, the model and storing the model in the model storage unit 104 is executed in advance as preprocessing.

The data acquisition unit 105 acquires a new image captured by the camera 101 from the camera 101. The data acquisition unit 105 is an interface for receiving the image from the camera 101.

When the data acquisition unit 105 acquires the new image from the camera 101, the identification unit 106 identifies the object indicated by the image by applying the image to the model stored in the model storage unit 104. In this example, the identification unit 106 determines whether the object appearing in the image is the "automobile", the "motorcycle", the "bus", or only the "background" appears by applying the image to the model.

Figures 4, 5:
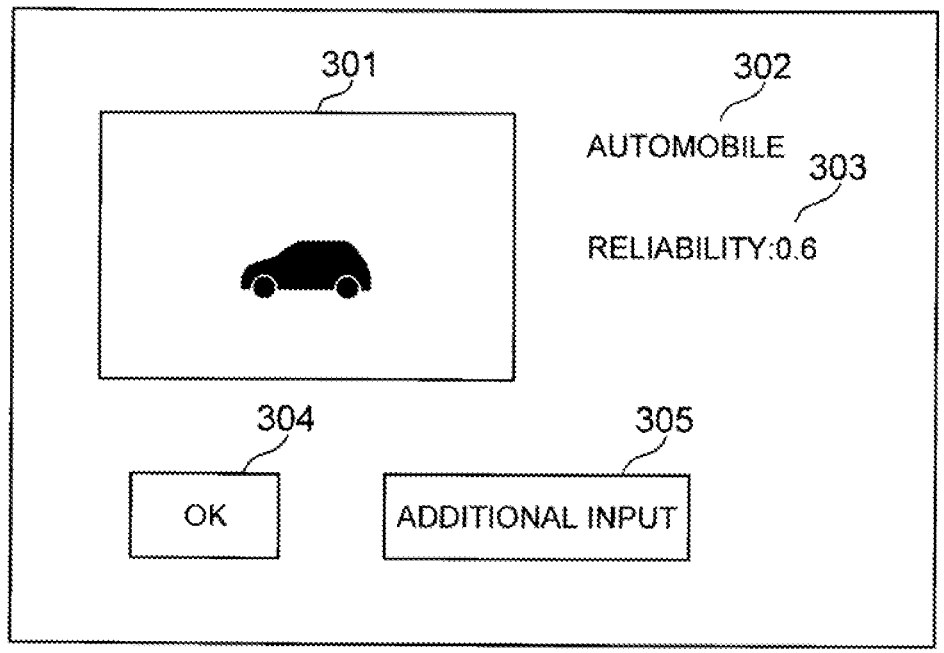
FIG. 4 It depicts a schematic diagram illustrating an example of a result of identification processing to be stored in a data storage unit by an identification unit.
FIG. 5 It depicts a schematic diagram illustrating an example of a screen displayed on a display device by a label reception unit.

When the image is obtained, the vector $(X1, X2, \ldots, Xn)^T$ representing the image is determined. The identification unit 106 calculates reliabilities of the "automobile", the "motorcycle", the "bus", and the "background" by using the vector $(X1, X2, \ldots, Xn)^T$, the coefficients of each layer included in the model (a1 to am, b1 to bj, or the like), and the weights included in the model. The identification unit 106 determines, as an identification result, an item having the highest reliability among the "automobile", the "motorcycle", the "bus", and the "background". For example, as a result of the identification unit 106 applying the vector representing the image to the model, the reliabilities of the "automobile", the "motorcycle", the "bus", and the "background" are obtained as "0.6", "0.2", "0.1", and "0.1". In this case, the identification unit 106 identifies that the object appearing in the image is the "automobile" with the highest reliability "0.6". The identification unit 106 stores a combination of the given image, the identification result, and the reliability corresponding to the identification result in the data storage unit 112. FIG. 4 is a schematic diagram illustrating an example of the result of the identification processing stored by the identification unit 106 in the data storage unit 112. In this example, as illustrated in FIG. 4, the identification unit 106 stores the image, the identification result of the "automobile" and the reliability "0.6" of the identification result in association with each other in the data storage unit 112.

The data storage unit 112 is the storage device that stores the image, the identification result, the reliability, and the like. When a correct result (correct label) is input or the rectangular region surrounding the object appearing in the image is designated by the operator of the data providing system 100, the data storage unit 112 also stores the correct result and the coordinates indicating the rectangular region (for example, the coordinates of each vertex of the rectangular region).

The keyboard 107 and the mouse 108 are input devices used by the operator of the data providing system 100 to input information to the computer 102. However, the keyboard 107 and the mouse 108 are examples of the input device, and the input device is not limited to the keyboard 107 and the mouse 108.

The label reception unit 110 displays the image on which the identification processing is performed by the identification unit 106 and the result of the identification processing (the identification result and the reliability) on the display device 109, and displays a graphical user interface (GUI) used by the operator to input the fact that the result of the identification processing is appropriate and a GUI used by the operator to input the correct label indicating the object appearing in the image since the result of the identification processing is not appropriate on the display device 109.

FIG. 5 is a schematic diagram illustrating an example of the screen displayed by the label reception unit 110 on the display device 109. The label reception unit 110 displays an image 301 on which the identification processing is performed by the identification unit 106, displays the identification result (in this example, "automobile") in an identification result display field 302, and displays the reliability corresponding to the identification result ("0.6" in this example) in a reliability display field 303. The label reception unit 110 displays an OK button 304 and an additional input button 305 on the screen.

The OK button 304 is a button clicked when the operator determines that the identification result has no problem. When the label indicating the object appearing in the image is displayed as the identification result, the operator determines that the identification result has no problem. In the example illustrated in FIG. 5, the operator determines that the identification result has no problem, and clicks the OK button 304. When the OK button 304 is clicked, the label reception unit 110 does not add data to the data stored in the data storage unit 112 by the identification unit 106 (see FIG. 4).

When a label indicating an object different from the object appearing in the image is displayed as the identification result, the operator determines that the identification result has a problem. In this case, the operator clicks the additional input button 305.

Figure 6:
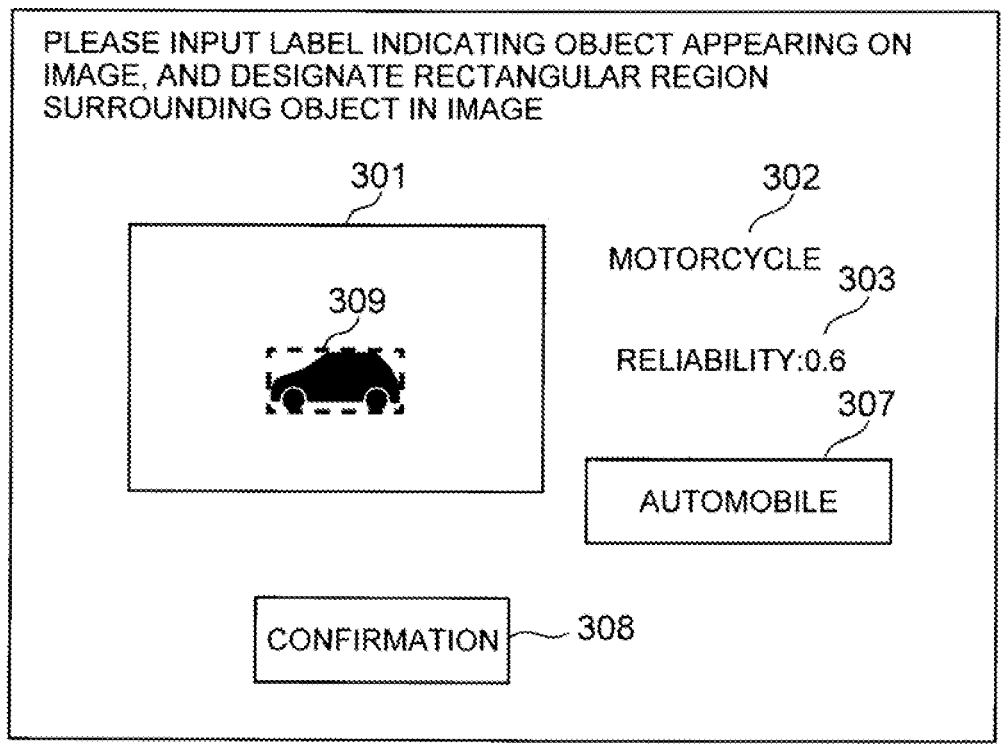
FIG. 6 It depicts a schematic diagram illustrating an example of a screen displayed on the display device by the label reception unit.

FIG. 6 is a schematic diagram illustrating an example of a screen displayed by the label reception unit 110 on the display device 109 when the additional input button 305 is clicked. The label reception unit 110 displays the image 301 on which the identification processing is performed by the identification unit 106, displays the identification result in the identification result display field 302, and displays the reliability corresponding to the identification result in the reliability display field 303. FIG. 6 illustrates an example when the "motorcycle" is displayed as the identification result even though the automobile appears in the image and the additional input button 305 (see FIG. 5) is clicked. The label reception unit 110 displays a label input field 307 and a confirmation button 308 in the screen illustrated in FIG. 6.

The label input field 307 is a field in which the operator inputs the correct label indicating the object appearing in the image 301. The operator inputs the correct label indicating the object appearing in the image 301 to the label input field 307 in the screen illustrated in FIG. 6. The operator designates the rectangular region surrounding the object (in this example, automobile) in the image 301 by operating the mouse 108. The confirmation button 308 is a button clicked by the operator when the input of the label and the designation of the rectangular region are completed.

FIG. 6 illustrates a case where the operator inputs the "automobile" which is the correct label indicating the object appearing in the image 301 to the label input field 307. FIG. 6 illustrates a case where the operator designates a rectangular region 309 surrounding the object (automobile) appearing in the image 301 by using the mouse 108. When the operator inputs the label into the label input field 307, further designates the rectangular region 309 by using the mouse 108, and then clicks the confirmation button 308, the label reception unit 110 acquires the label input by the operator and the coordinates indicating the rectangular region 309 designated by the operator. The label reception unit 110 stores the result of the identification processing stored in the data storage unit 112 by the identification unit 106 in association with the label input by the operator and the coordinates indicating the rectangular region 309 designated by the operator.

FIG. 7 is a schematic diagram illustrating an example of the result of the identification processing stored in the data storage unit 112 by the identification unit 106 and information added by the label reception unit 110. FIG. 7 illustrates a state in which the identification unit 106 stores the image, the identification result "motorcycle", and the reliability "0.6" in the data storage unit 112 and the label reception unit 110 additionally stores the label "automobile" input via the screen illustrated in FIG. 6 and the coordinates indicating the rectangular region 309 in the data storage unit 112.

The transmission target data determination unit 111 determines whether or not the image on which the identification processing is performed by the identification unit 106 is the transmission target data to be transmitted to the collection device 200. The transmission target data determination unit 111 determines, as the transmission target data, an image that can contribute to the generation of a model with high identification accuracy. Here, the image that can contribute to the generation of the model with high identification accuracy means, for example, that the result of the identification performed by the identification unit 106 by using the model is different from the object appearing in the image and the reliability is equal to or less than a predetermined threshold value even though the result of the identification performed by the identification unit 106 by using the model indicates the object appearing in the image. These images are images for which correct identification results and high reliabilities are not obtained, and a model having higher identification accuracy can be generated by using, as the training data, such images, labels indicating objects appearing in the images, and rectangular regions surrounding the objects in the images. The transmission target data determination unit 111 determines such images as the transmission target data.

Hereinafter, three types of determination methods will be described as examples of the method for determining, by the transmission target data determination unit 111, whether or not the image is the transmission target data. The transmission target data determination unit 111 may determine whether or not the image is the transmission target data by employing one determination method, or the transmission target data determination unit 111 may determine whether or not the image is the transmission target data by employing a plurality of determination methods.

[First Determination Method]

The first determination method is a method for determining, by the transmission target data determination unit 111, that the image is the transmission target data when the operator determines that the identification result of the identification unit 106 for the image is erroneous and the operator inputs the correct label indicating the object appearing in the image. In this case, as described with reference to FIGS. 6 and 7, the label reception unit 110 acquires the label input by the operator and the coordinates indicating the rectangular region 309 designated by the operator, and stores the label and the coordinates in association with the image in the data storage unit 112. The transmission target data determination unit 111 associates the image determined to be the transmission target data with the label and the coordinates, and determines that the group of the image, the label, and the coordinate is data to be transmitted to the collection device 200.

On the screen illustrated in FIG. 6, when the operator inputs the label, designates the rectangular region 309, and clicks the confirmation button 308, it can be said that the operator inputs information indicating that the image displayed on the screen is the transmission target data. Thus, in the first transmission method, when the operator inputs the information indicating that the image displayed on the screen is the transmission target data, it can be said that the transmission target data determination unit 111 determines that the image is the transmission target data. When the OK button 304 is clicked on the screen illustrated in FIG. 5, the transmission target data determination unit 111 determines that the image displayed on that screen is not the transmission target data.

[Second Determination Method]

In the second determination method, the transmission target data determination unit 111 determines whether or not the image is the transmission target data based on the result obtained by applying the image to the model. As described above, the identification unit 106 calculates the reliabilities of the "automobile", the "motorcycle", the "bus", and the "background" by applying the image to the model, and determines, as the identification result, the item having the highest reliability. In the second determination method, the transmission target data determination unit 111 determines whether or not the image is the transmission target data based on the reliability corresponding to the identification result. More specifically, when the reliability corresponding to the identification result is equal to or less than a predetermined threshold value, the transmission target data determination unit 111 determines that the image as a target used in the identification processing is the transmission target data. When the reliability exceeds a predetermined threshold value, the transmission target data determination unit 111 determines that the image as the target used in the identification processing is not the transmission target data. This threshold value is, for example, "0.5", but is not limited to "0.5". Hereinafter, a case where this threshold value is "0.5" will be described as an example.

Figure 8:
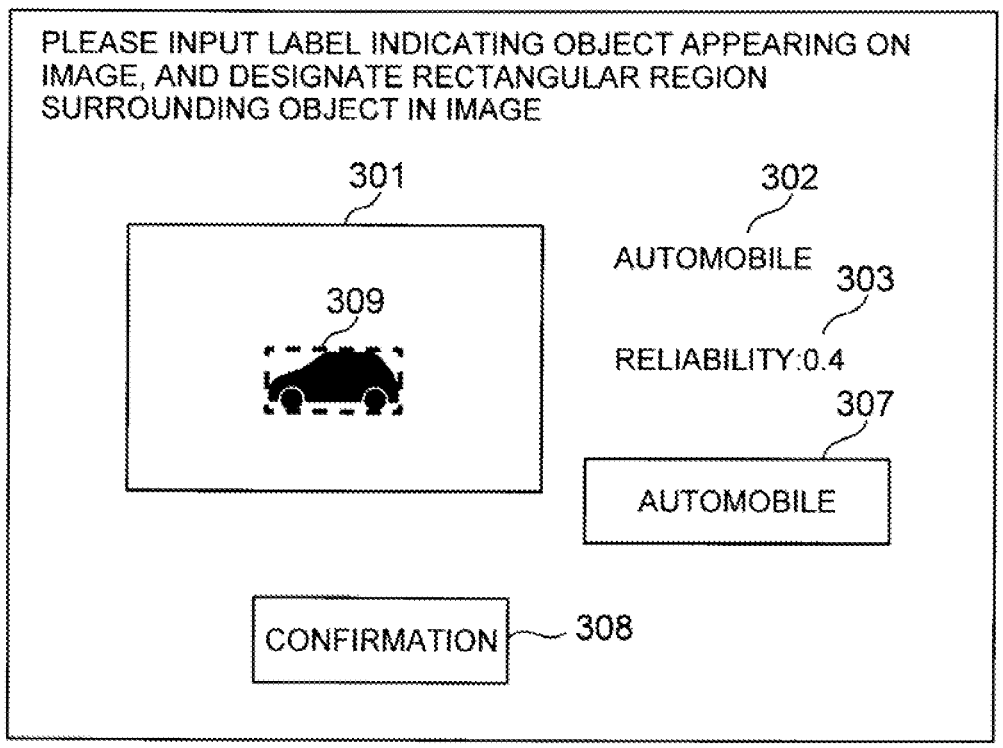
FIG. 8 It depicts a schematic diagram illustrating an example of a screen displayed on the display device by the label reception unit.

When the reliability is equal to or less than the predetermined threshold value, the transmission target data determination unit 111 determines that the image as the target used in the identification processing is the transmission target data, and the label reception unit 110 displays the screen on which the operator inputs the label or designates the rectangular region surrounding the object in the image. This screen is similar to the screen illustrated in FIG. 6. FIG. 8 is a schematic diagram illustrating an example of a screen displayed by the label reception unit 110 on the display device 109 when the image is determined to be the transmission target data by the second determination method. The same components as the components illustrated in FIG. 6 are designated by the same reference signs as those in FIG. 6. In the example illustrated in FIG. 8, the identification result "automobile" is correct. However, the reliability "0.4" corresponding to the identification result is equal to or less than the threshold value, and the transmission target data determination unit 111 determines that the image 301 is the transmission target data. In the second determination method, when the screen illustrated in FIG. 8 is displayed, the operator inputs the correct label indicating the object appearing in the image 301, designates the rectangular region surrounding the object (in this example, automobile) in the image 301, and then clicks the confirmation button 308. The label reception unit 110 acquires the label input by the operator and the coordinates indicating the rectangular region 309 designated by the operator. The label reception unit 110 stores the result of the identification processing stored in the data storage unit 112 by the identification unit 106 in association with the label and the coordinates in the data storage unit 112. The transmission target data determination unit 111 associates the image determined to be the transmission target data with the label and the coordinates, and determines that the group of the image, the label, and the coordinate is data to be transmitted to the collection device 200.

[Third Determination Method]

In the third determination method, the transmission target data determination unit 111 determines whether or not the image is the transmission target data based on the result obtained by applying the image to the model. The identification unit 106 specifies the identification result and the reliability corresponding to the identification result by applying the image to the model. The transmission target data determination unit 111 transmits the image and a signal requesting that the identification result of the object obtained by performing the identification processing on the image is to be transmitted to the transmission target data determination unit 111 to a different data providing system 100. Hereinafter, the different data providing system is denoted by a reference sign "100z". The different data providing system 100z that receives the image and this signal from the transmission target data determination unit 111 derives the identification result of the object appearing in the image by applying the received image to the model retained by the data providing system 100z, and sends the identification result back to the transmission target data determination unit 111 of the data providing system 100 as a request source.

The transmission target data determination unit 111 may transmit the image and the above-described signal to a plurality of different data providing systems 100z. The different data providing system 100z that is a sending destination of the image may be determined in advance.

The transmission target data determination unit 111 determines whether or not the image is the transmission target data by using not only the identification result specified by the identification unit 106 in the computer 102 including the transmission target data determination unit 111 but also the identification result for the image acquired from the different data providing system 100z. Specifically, when the identification result of the object appearing in the image specified by the identification unit 106 in the computer 102 including the transmission target data determination unit 111 and the identification result for the image acquired from the different data providing system 100z are different, the transmission target data determination unit 111 determines that the image is the transmission target data. When the identification result of the object appearing in the image specified by the identification unit 106 and the identification result for the image acquired from the different data providing system 100z are the same, the transmission target data determination unit 111 determines that the image is not the transmission target data. When the identification results are acquired from the plurality of different data providing systems 100z, the transmission target data determination unit 111 may determine that the image is the transmission target data when there is at least one identification result different from the identification result of the object appearing in the image specified by the identification unit 106.

It can be said that an image for which the identification result using the identification unit 106 and the identification result using the different data providing system 100z are different is an image on which it is difficult to identify the appearing object and is an image that contributes to the generation of a model with high identification accuracy.

In the third determination method, when the transmission target data determination unit 111 determines that the image as the target used in the identification processing is the transmission target data, the label reception unit 110 displays the same screen as the screen illustrated in FIG. 6 or FIG. 8, and receives the input of the correct label indicating the object appearing in the image and the designation of the rectangular region surrounding the object in the image. The label reception unit 110 stores the result of the identification processing stored in the data storage unit 112 by the identification unit 106 in association with the label and the coordinates indicating the rectangular region in the data storage unit 112. The transmission target data determination unit 111 associates the image determined to be the transmission target data with the label and the coordinates, and determines that the group of the image, the label, and the coordinate is data to be transmitted to the collection device 200.

As described above, the transmission target data determination unit 111 may determine whether or not the image is the transmission target data by employing the plurality of determination methods. In this case, when the image is determined to be the transmission target data by any determination method of the first to third determination methods, the transmission target data determination unit 111 may confirm that the image is the transmission target data.

The data transmission unit 113 transmits the image determined to be the transmission target data to the collection device 200 at a predetermined timing. As described above, in any determination method of the first to third determination methods, the transmission target data determination unit 111 associates the image determined to be the transmission target data with the label input by the operator and the coordinates indicating the rectangular region 309 (see FIGS. 6 and 8), and determines that the group of the image, the label, and the coordinates is the data to be transmitted to the collection device 200. Accordingly, the data transmission unit 113 transmits all the groups of the image determined to be the transmission target data, the label, and the coordinates indicating the rectangular region 309 to the collection device 200 at a predetermined timing. However, the data transmission unit 113 may not transmit the group already transmitted to the collection device 200 again.

A timing at which the data transmission unit 113 transmits the group of the image determined to be the transmission target data, the label, and the coordinates to the collection device 200 will be described.

At a timing at which a capacity of each image determined to be the transmission target data is equal to or greater than a predetermined capacity to the collection device 200, the data transmission unit 113 may transmit each group of the image determined to be the transmission target data, the label, and the coordinates which are obtained until this point in time. That is, the data transmission unit 113 may transmit the data to be transmitted to the collection device 200 at a timing at which the total sum of the capacities of the images determined to be the transmission target data is equal to or greater than the predetermined capacity.

The data transmission unit 113 may transmit each group of the image determined to be the transmission target data, the label, and the coordinates to the collection device 200 at a predetermined time. For example, when 12:00 a.m. is determined as a data transmission time in advance, every day at 12:00 a.m., the data transmission unit 113 may transmit each group of the image determined to be the transmission target data, the label, and the coordinates which are obtained until this point in time to the collection device 200.

At a timing at which an erroneous identification rate is equal to or greater than a predetermined threshold value, the data transmission unit 113 may transmit each group of the image determined to be the transmission target data, the label, and the coordinates which are obtained until this point in time to the collection device 200 while referring to the erroneous identification rate obtained for each fixed period (for example, every day). The erroneous identification rate may be calculated by the index value counting unit 114 for each fixed period. For example, the index value counting unit 114 calculates the erroneous identification rate every day. The erroneous identification rate is a ratio of the number of images determined by the operator that the identification result is erroneous to the total number of images as the targets of the identification processing performed by the identification unit 106 for a fixed period (one day in this example). The number of images determined by the operator that the identification result is erroneous corresponds to, for example, the number of times the additional input button 305 illustrated in FIG. 5 is clicked. Thus, the index value counting unit 114 counts the number of images as the targets of the identification processing performed by the identification unit 106 within a fixed period, and counts the number of times the additional input button 305 illustrated in FIG. 5 is clicked within this fixed period. The index value counting unit 114 may calculate, as the erroneous identification rate, a ratio of the counting result of the number of times the additional input button 305 is clicked to the counting result of the number of images as the targets of the identification processing performed by the identification unit 106. The index value counting unit 114 recalculates the erroneous identification rate for each fixed period. The data transmission unit 113 may refer to the erroneous identification rate calculated for each fixed period in this manner.

At a timing at which an instruction to transmit each image determined to be the transmission target data is received from the operator of the data providing system 100, the data transmission unit 113 may transmit each group of the image determined to be the transmission target data, the label, and the coordinates which are obtained until this point in time to the collection device 200. This case will be described in detail. The index value counting unit 114 counts an index value indicating identification accuracy of the model in addition to the above-mentioned erroneous identification rate for each fixed period. Although the erroneous identification rate for each fixed period can also be referred to as the index value indicating the identification accuracy of the model, the index value counting unit 114 counts, as the index value indicating the identification accuracy of the model, the total number of images of which the reliability for the identification result is equal to or less than the threshold value (in this example, "0.5") and the total number of images determined by the operator that the identification result is erroneous in addition to the erroneous identification rate for each fixed period. As already described above, the number of images determined by the operator that the identification result is erroneous corresponds to the number of times the additional input button 305 illustrated in FIG. 5 is clicked. Accordingly, the index value counting unit 114 may count, as the total number of images determined by the operator that the identification result is erroneous, the total number of times the additional input button 305 illustrated in FIG. 5 is clicked. Hereinafter, the total number of images of which the reliability for the identification result is equal to or less than the threshold value (in this example, "0.5") is referred to as the "number of identification results having low reliability". The total number of images determined by the operator that the identification result is erroneous is referred to as the "number of erroneous identifications".

Figure 9:
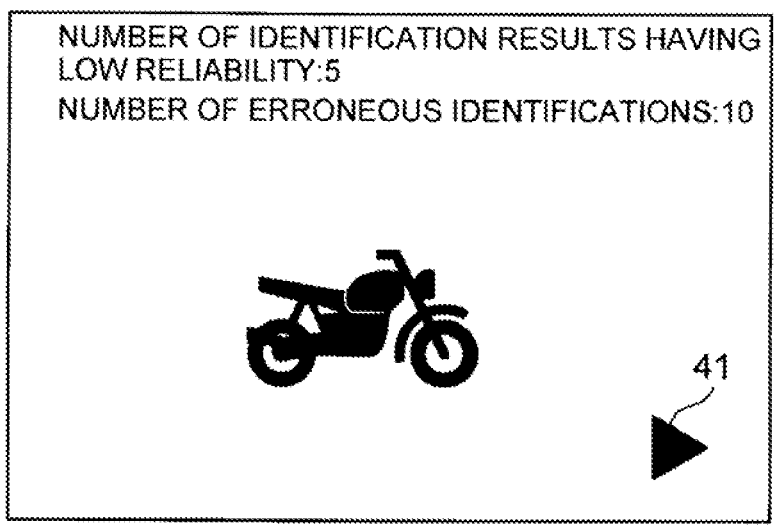
FIG. 9 It depicts a schematic diagram illustrating an example of a screen including the number of identification results having low reliability, the number of erroneous identifications, and a transmission instruction button.

The display control unit 115 displays the number of identification results having low reliability and the number of erroneous identifications derived by the index value counting unit 114 and a GUI for instructing that each image determined to be the transmission target data is to be transmitted on the display device 109. Hereinafter, a case where this GUI is a button will be described as an example, and this button will be referred to as a transmission instruction button. The display control unit 115 may display the number of identification results having low reliability, the number of erroneous identifications, and the transmission instruction button in a state of being superimposed on, for example, the image as the target recently used in the identification processing on the display device 109. FIG. 9 is a schematic diagram illustrating an example of a screen including the number of identification results having low reliability, the number of erroneous identifications, and the transmission instruction button. FIG. 9 illustrates a case where the display control unit 115 displays the number of identification results having low reliability, the number of erroneous identifications, and the transmission instruction button 41 in a state of being superimposed on the image as the target recently used in the identification processing on the display device 109.

The computer 102 may switch between the screen illustrated in FIG. 5 and the screen illustrated in FIG. 9 according to an operation of the operator. Similarly, the computer 102 may switch between the screens illustrated in FIGS. 6 and 8 and the screen illustrated in FIG. 9 according to the operation of the operator.

When the index value counting unit 114 updates values of the number of identification results having low reliability and the number of erroneous identifications, the display control unit 115 accordingly updates the values of the number of identification results having low reliability and the number of erroneous identifications to be displayed on the display device 109.

The operator clicks the transmission instruction button 41 (see FIG. 9) when it is determined that it is a timing to transmit each group of the image determined to be the transmission target data, the label, and the coordinates which are already obtained to the collection device 200 while referring to the displayed values of the number of identification results having low reliability and the number of erroneous identifications. A case where the transmission instruction button 41 is clicked means that the instruction to transmit each image determined to be the transmission target data is input. When the transmission instruction button 41 is clicked, the data transmission unit 113 transmits each group of the image determined to be the transmission target data, the label, and the coordinates which are obtained up to this point in time to the collection device 200.

At a timing at which a data transmission request is received from the collection device 200, the data transmission unit 113 may transmit each group of the image determined to be the transmission target data, the label, and the coordinates which obtained until this point in time to the collection device 200. An operation of sending, by the collection device 200, the data transmission request to the data providing system 100 will be described in detail in a second exemplary embodiment.

Heretofore, a plurality of types of transmission timings has been described. The data transmission unit 113 may transmit the data to the collection device 200 at any one timing of the above-described plurality of types of transmission timing. Alternatively, the data transmission unit 113 may transmit the data to the collection device 200 at a plurality of types of timings among the above-described various timings.

The data transmission unit 113 is realized by, for example, a central processing unit (CPU) of the computer 102 that operates according to a data providing program and a communication interface of the computer 102. For example, the CPU may read the data providing program from a program recording medium such as a program storage device of the computer 102, and operate as the data transmission unit 113 by using the communication interface according to the data providing program. When the transmission target data determination unit 111 employs the above-described third determination method, the transmission target data determination unit 111 is also realized by, for example, the CPU of the computer 102 that operates according to the data providing program and the communication interface of the computer 102. That is, the CPU that reads the data providing program as described above may operate as the transmission target data determination unit 111 by using the communication interface according to the data providing program. The learning unit 103, the identification unit 106, the label reception unit 110, the transmission target data determination unit 111, the index value counting unit 114, and the display control unit 115 are also realized by, for example, the CPU of the computer 102 that operates according to the data providing program. That is, the CPU that reads the data providing program as described above may operate as the learning unit 103, the identification unit 106, the label reception unit 110, the transmission target data determination unit 111, the index value counting unit 114, and the display control unit 115 according to the data providing program. The model storage unit 104 and the data storage unit 112 are realized by the storage device included in the computer 102.

The model storage unit 104 and the identification unit 106 may be provided on the camera 101 side.

Figure 10:
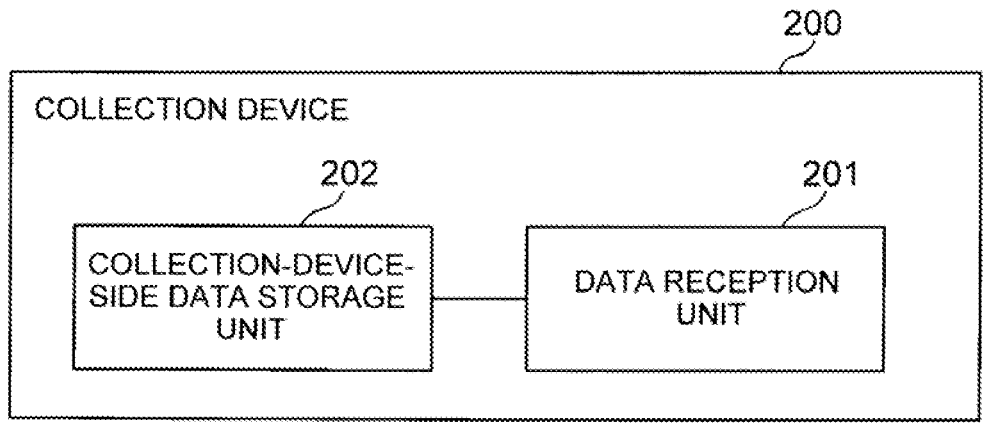
FIG. 10 It depicts a block diagram illustrating a configuration example of a collection device according to the first exemplary embodiment.

FIG. 10 is a block diagram illustrating a configuration example of the collection device 200 according to the first exemplary embodiment. The collection device 200 is realized by a computer. The collection device 200 includes a data reception unit 201 and a collection-device-side data storage unit 202.

The data reception unit 201 receives the data (the set of groups of the image, the label and the coordinates) transmitted by the data transmission unit 113 (see FIG. 2) of the data providing system 100. The data reception unit 201 does not receive the data from only one data providing system 100, but receives the data from each of the plurality of data providing systems 100 illustrated in FIG. 1.

When the data is received from each data providing system 100, the data reception unit 201 stores the received data in the collection-device-side data storage unit 202.

The collection-device-side data storage unit 202 is a storage device that stores the data received from each data providing system 100.

The data reception unit 201 is realized by, for example, a CPU of a computer that operates according to a collection device program and a communication interface of the computer. For example, the CPU may read the collection device program from a program recording medium such as a program storage device of the computer, and operate as the data reception unit 201 by using the communication interface according to the collection device program. The collection-device-side data storage unit 202 is realized by a storage device included in the computer.

Figure 11:
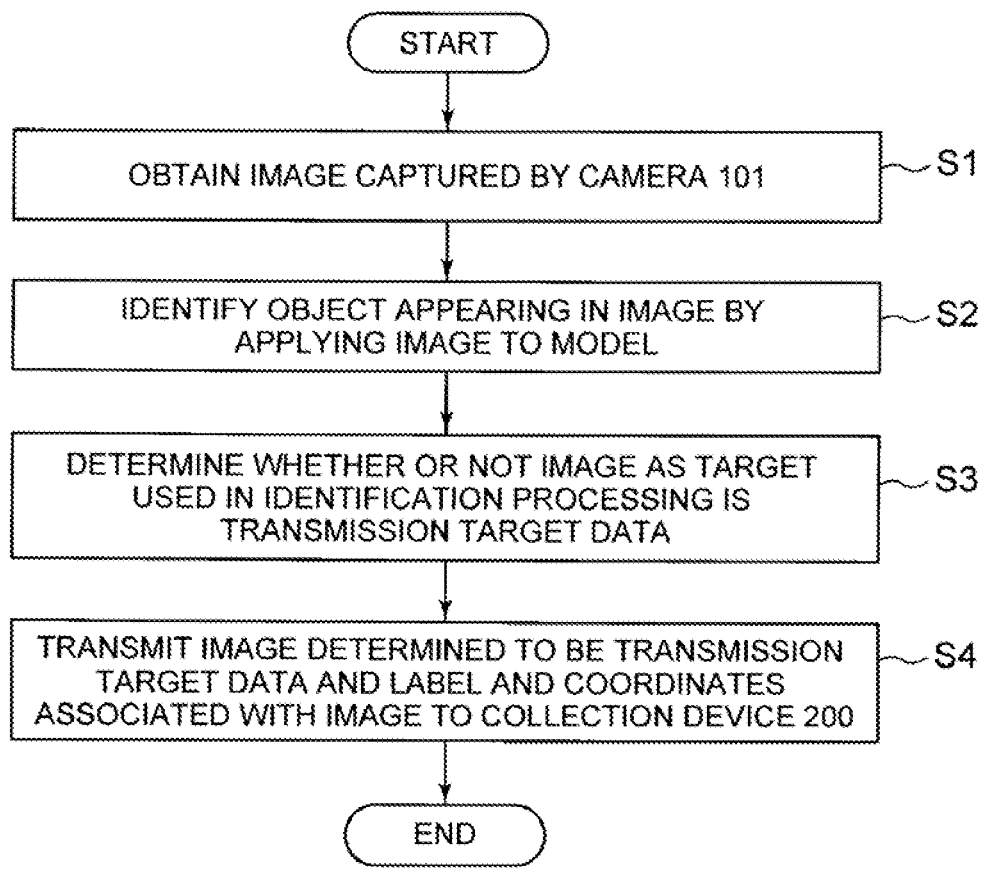
FIG. 11 It depicts a flowchart illustrating an example of a processing progress of the data providing system of the first exemplary embodiment.

Next, a processing progress of the first exemplary embodiment will be described. Detailed description of the operations already described will be omitted. FIG. 11 is a flowchart illustrating an example of the processing progress of the data providing system 100 according to the first exemplary embodiment. It is assumed that the learning unit 103 learns the model in advance by deep learning and stores the model in the model storage unit 104.

First, the camera 101 obtains an image by performing capturing at the installation location of the camera 101 (step S1). The camera 101 transmits the image to the computer 102.

The identification unit 106 of the computer 102 receives the image via the data acquisition unit 105. The identification unit 106 identifies the object appearing in the image by applying the image to the model (step S2). In the present example, the identification unit 106 identifies whether the object appearing in the image is the "automobile", the "motorcycle", the "bus", or the "background (that is, the automobile, the motorcycle, or the bus does not appear)". The identification unit 106 also calculates the reliability corresponding to the identification result in the process of obtaining the identification result.

After step S2, the transmission target data determination unit 111 determines whether or not the image as the target used in the identification processing in step S2 is the transmission target data (step S3). Examples of the method for determining whether or not the image is the transmission target data include the above-described first determination method, second determination method, and third determination method. The transmission target data determination unit 111 may determine whether or not the image is the transmission target data by any one method of the first determination method, the second determination method, and the third determination method. The transmission target data determination unit 111 may determine whether or not the image is the transmission target data by employing a plurality of methods among the first determination method, the second determination method, and the third determination method.

When it is determined whether or not the image is the transmission target data, the transmission target data determination unit 111 acquires the correct label indicating the object appearing in the image from the operator via the screens illustrated in FIG. 6 and FIG. 8 or designates the rectangular region surrounding the object in the image. The transmission target data determination unit 111 determines, as the data to be transmitted to the collection device 200, the group of the image that is the transmission target data, the label thereof, and the coordinates indicating the rectangular region.

The data transmission unit 113 transmits, at a predetermined timing, each group of the image determined to be the transmission target data, the label, and the coordinates which are obtained until this point in time to the collection device 200 (step S4). Since various examples of the timing at which the data transmission unit 113 transmits the data to the collection device 200 are already described, the description thereof will be omitted.

The data reception unit 201 (see FIG. 10) of the collection device 200 receives the data transmitted by the data transmission unit 113 in step S4, and stores the data in the collection-device-side data storage unit 202.

According to the present exemplary embodiment, the transmission target data determination unit 111 determines whether or not the image is the transmission target data by using at least one of the above-described first determination method, second determination method, and third determination method. Accordingly, the image that is the transmission target data is the image for which the identification result of the identification unit 106 is erroneous, the image of which the reliability corresponding to the identification result is equal to or less than the threshold value, or the image for which the identification result of the identification unit 106 and the identification result of the different data providing system 100z are different. These images are images for which correct identification results are difficult to be obtained, and a model with high identification accuracy can be obtained by performing deep learning by using these images as the training data. The data transmission unit 113 transmits such an image to the collection device 200 together with the label and the coordinates designated by the operator. Thus, according to the present exemplary embodiment, the collection device 200 can easily collect the data that can contribute to the generation of the model with high identification accuracy.

Since an environment in which the camera 101 of each data providing system 100 performs capturing is different, various kinds of data are accumulated as the group of the image, the label, and the coordinates in the collection-device-side data storage unit 202. Accordingly, the deep learning is performed by using the data accumulated in the collection-device-side data storage unit 202 as the training data, and thus, a highly versatile model that can perform the identification processing with high accuracy on the images obtained in various capturing environments can be generated.

Second Exemplary Embodiment

A data collection system according to a second exemplary embodiment of the present invention includes the plurality of data providing systems 100 and the collection device 200 as in the case illustrated in FIG. 1.

Figure 12:
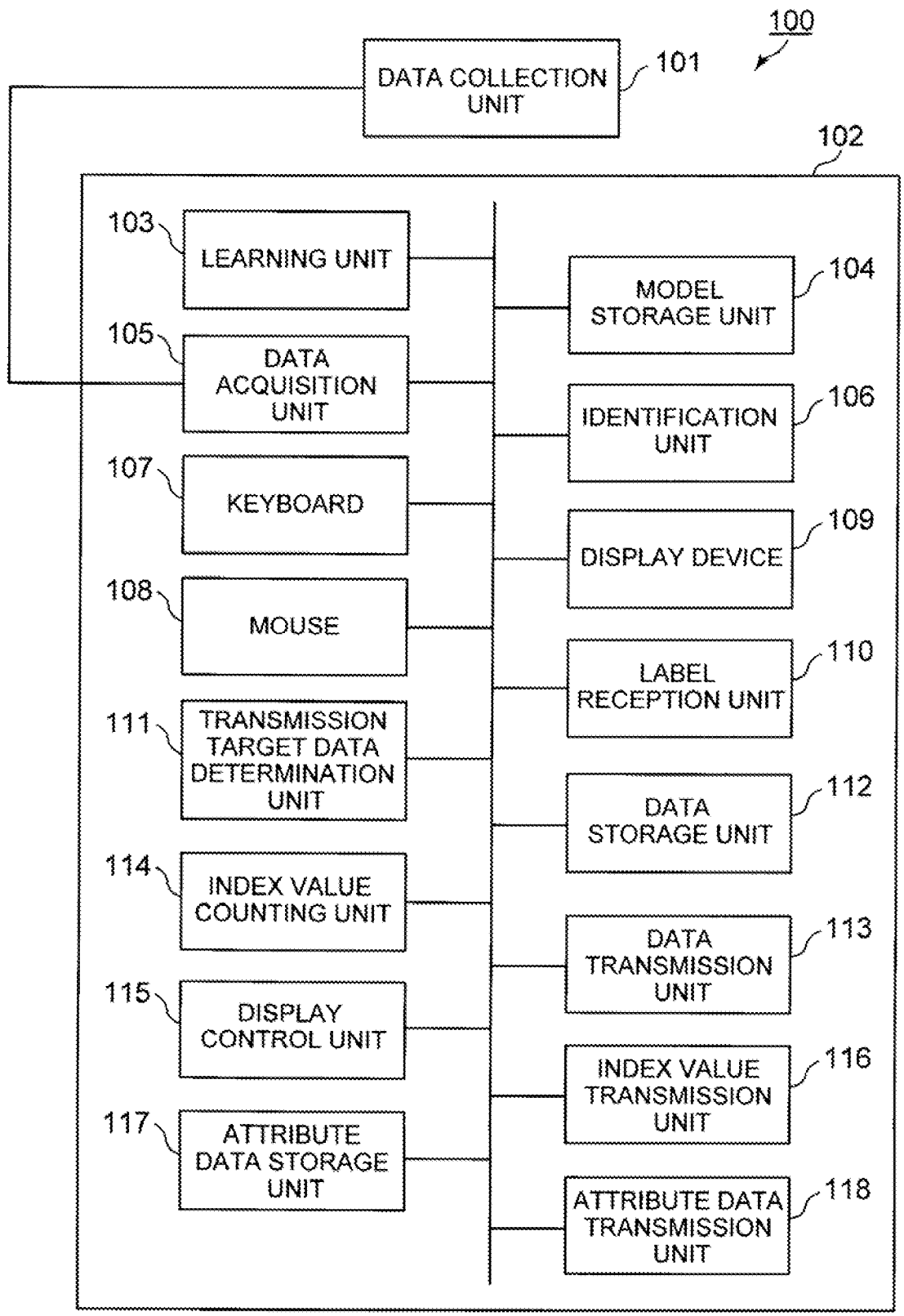
FIG. 12 It depicts a block diagram illustrating a configuration example of a data providing system according to a second exemplary embodiment.

FIG. 12 is a block diagram illustrating a configuration example of the data providing system 100 according to the second exemplary embodiment. The plurality of data providing systems 100 included in the data collection system has the same configuration, and a configuration of each data providing system 100 according to the second exemplary embodiment can be represented as illustrated in FIG. 12. The same constituent components as the constituent components illustrated in FIG. 2 are designated by the same reference signs as those in FIG. 2, and the description thereof will be omitted. The description of the matters described in the first exemplary embodiment will be omitted.

In the second exemplary embodiment, a case where the data collection unit 101 is the camera will be described as an example, and the data collection unit 101 is referred to as the camera 101. A computer 102 included in the data providing system 100 includes an index value transmission unit 116, an attribute data storage unit 117, and an attribute data transmission unit 118 in addition to the components included in the computer 102 (see FIG. 2) in the first exemplary embodiment. Among the components included in the data providing system 100, the components other than the index value transmission unit 116, the attribute data storage unit 117, and the attribute data transmission unit 118 are the same as the components in the first exemplary embodiment, and the description thereof will be omitted.

When the index value counting unit 114 updates the values of the number of identification results having low reliability and the number of erroneous identifications, the index value transmission unit 116 transmits the updated number of identification results having low reliability and the updated number of erroneous identifications together with the identification information of the data providing system 100 to the collection device 200.

The attribute data storage unit 117 is a storage device that stores data (attribute data) indicating an attribute of the camera 101 connected to the computer 102 including the attribute data storage unit 117. The attribute of the camera 101 includes an attribute of the camera 101 itself, an attribute depending on the environment in which the camera 101 is installed, and the like. A value of each attribute is represented by a numerical value. An administrator of the data providing system 100 may determine the value of each attribute in advance depending on the settings and installation environment of the camera 101, and the like. The attribute data is represented by a vector of which elements are the values (numerical values) of such attributes.

The attribute data of the camera 101 includes at least values of at least a part of attributes "angle of view of the camera 101", "whether the camera 101 is installed indoors or outdoors", "target to be captured by the camera 101", and "movement direction of the target to be captured by the camera 101". Which attribute value is the element of the attribute data represented by the vector is common to all the data providing systems 100, and which attribute value is what number among the elements of the vector is also common to all the data providing systems 100. The numerical value that is each element of the vector may be different for each data providing system 100.

Since the "angle of view of the camera 101" is represented by the numerical value, the administrator may determine the numerical value representing the angle of view as the element of the vector.

For the attribute "whether the camera 101 is installed indoors or outdoors", for example, when the camera 101 is installed indoors, the value of this attribute may be determined as "0", and when the camera 101 is installed outdoors, the value of this attribute is determined as "1".

For the attribute "target to be captured by the camera 101", for example, when the camera 101 is installed so as to capture vehicles (for example, when the camera 101 is installed toward a roadway), the value of this attribute is determined as "0". When the camera 101 is installed so as to capture pedestrians (for example, when the camera 101 is installed toward a sidewalk), the value of this attribute is determined as "1". When the camera 101 is installed so as to capture both the vehicle and the pedestrian (for example, the camera 101 is installed toward a path through which both the vehicles and the pedestrians pass), the value of this attribute is determined to as "0.5".

For the attribute "movement direction of the target to be captured by the camera 101", a reference axis based on a main axis direction of the camera 101 is determined, and an angle formed by the reference axis and the main movement direction of the target to be captured may be determined as the value of this attribute.

Values of the attributes other than the above-described values may be included in the attribute data. For example, values such as "height of the installation location of the camera 101", "depression angle of the camera 101", and "resolution of the camera 101" may be included in the attribute data. Since all the "height of the installation location of the camera 101", the "depression angle of the camera 101", and the "resolution of the camera 101" are represented by numerical values, these numerical values may be determined as the elements of the vector.

The attribute data storage unit 117 stores the vector (attribute data) determined by the administrator as described above, and also stores the identification information of the data providing system 100 and positional information (for example, latitude and longitude) of the installation location of the camera 101. The vector (attribute data) thereof, the identification information of the data providing system 100, and the positional information of the installation location of the camera 101 may be stored in the attribute data storage unit 117 in advance by the administrator of the data providing system 100.

The attribute data transmission unit 118 transmits the vector (attribute data) stored in the attribute data storage unit 117, the identification information of the data providing system 100, and the positional information of the installation location of the camera 101 to the collection device 200.

The index value transmission unit 116 and the attribute data transmission unit 118 are realized by, for example, the CPU of the computer 102 that operates according to the data providing program and the communication interface of the computer 102. For example, the CPU may read the data providing program from the program recording medium such as the program storage device of the computer 102, and operate as the index value transmission unit 116 and the attribute data transmission unit 118 by using the communication interface according to the data providing program. The attribute data storage unit 117 is realized by a storage device included in the computer 102.

Figure 13:
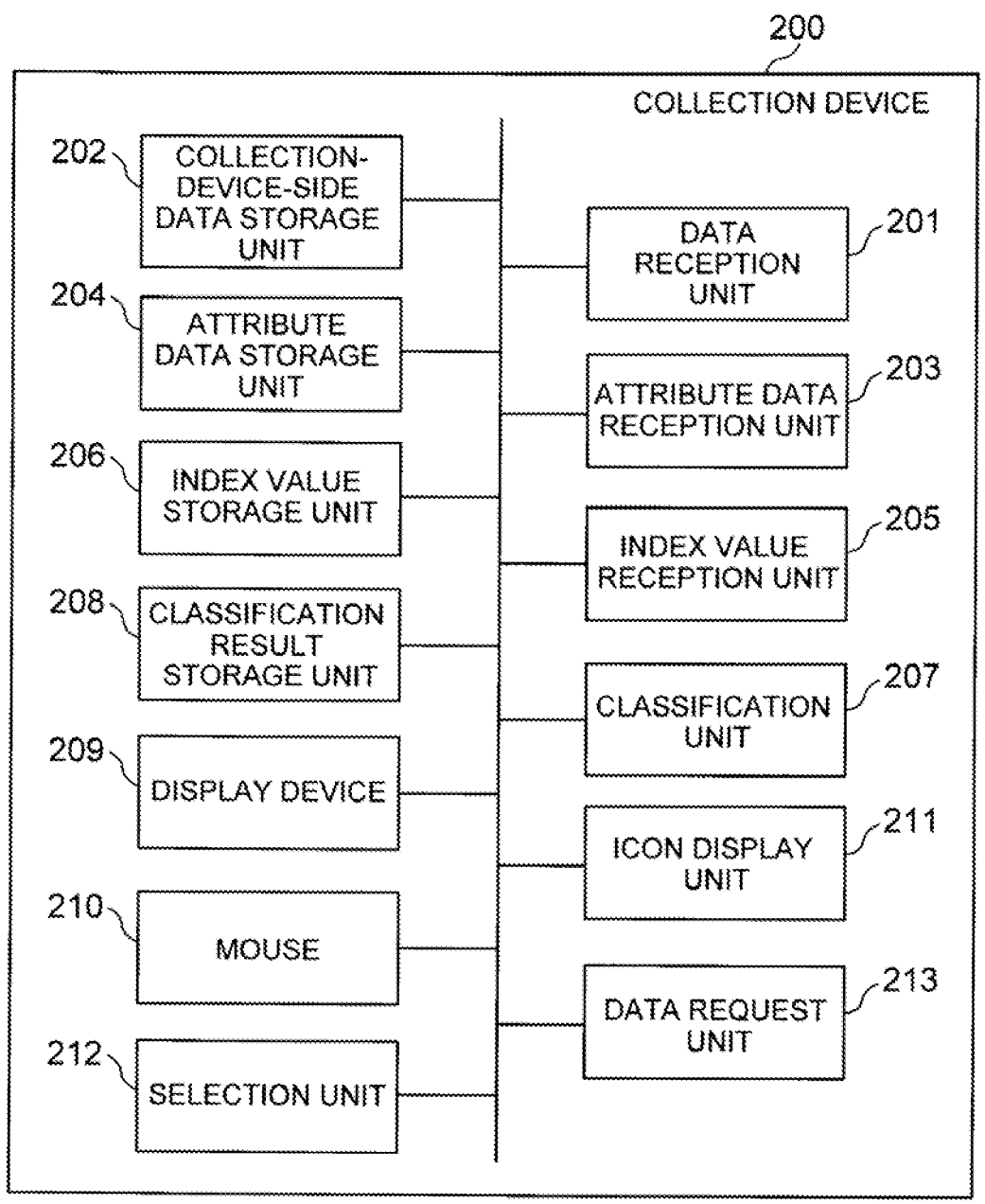
FIG. 13 It depicts a block diagram illustrating a configuration example of a collection device according to the second exemplary embodiment.

FIG. 13 is a block diagram illustrating a configuration example of the collection device 200 according to the second exemplary embodiment. The same constituent components as the constituent components illustrated in FIG. 10 are designated by the same reference signs as those in FIG. 10, and the description thereof will be omitted.

The collection device 200 according to the second exemplary embodiment includes the data reception unit 201, the collection-device-side data storage unit 202, an attribute data reception unit 203, an attribute data storage unit 204, an index value reception unit 205, an index value storage unit 206, a classification unit 207, a classification result storage unit 208, a display device 209, a mouse 210, an icon display unit 211, a selection unit 212, and a data request unit 213.

The data reception unit 201 and the collection-device-side data storage unit 202 are the same as the data reception unit 201 and the collection-device-side data storage unit 202 (see FIG. 10) in the first exemplary embodiment, and the description thereof will be omitted.

The attribute data reception unit 203 receives the attribute data (vector) of the camera 101 transmitted by the attribute data transmission unit 118 of each data providing system 100, the identification information of the data providing system 100, and the positional information of the installation location of the camera 101, and stores the received attribute data, identification information, and positional information in association with each other in the attribute data storage unit 204.

The attribute data storage unit 204 is a storage device that stores the attribute data of the camera 101, the identification information of the data providing system 100, and the positional information of the installation location of the camera 101 in association with each other for each data providing system 100.

The index value reception unit 205 receives the number of identification results having low reliability and the number of erroneous identifications together with the identification information of the data providing system 100 transmitted by the index value transmission unit 116 of each data providing system 100, and stores the number of identification results having low reliability and the number of erroneous identifications in association with the identification information of the data providing system 100 in the index value storage unit 206.

The index value storage unit 206 is a storage device that stores the identification information of the data providing system 100, the number of identification results having low reliability, and the number of erroneous identifications in association with each other for each data providing system 100.

The classification unit 207 classifies the data providing systems 100 into a plurality of groups by using the attribute data of the camera 101 of each data providing system 100 stored in the attribute data storage unit 204. More specifically, the classification unit 207 classifies the pieces of identification information of the data providing systems 100 into a plurality of groups.

For example, the classification unit 207 may classify the data providing systems 100 into the plurality of groups by a k-means method by using each attribute data represented by the vector.

The classification unit 207 stores the identification information of the group and the identification information of each data providing system 100 belonging to the group in association with each other in the classification result storage unit 208 for each classified group.

The classification result storage unit 208 is a storage device that stores identification information of the group and the identification information of each data providing system 100 belonging to the group in association with each other for each group.

Processing of classifying, by the classification unit 207, the data providing systems 100 into the plurality of groups based on the attribute data and storing the classification result in the classification result storage unit 208 is executed in advance as preprocessing.

The mouse 210 is an input device used by an operator of the collection device 200 to input information into the collection device 200. However, the mouse 210 is an example of the input device, and the input device is not limited to the mouse 210.

The icon display unit 211 displays icons indicating the individual data providing systems on the display device 209 in different modes (for example, different colors or patterns) for the groups based on the identification information of the group and the identification information of each data providing system 100 belonging to the group stored in the classification result storage unit 208.

Figure 14:
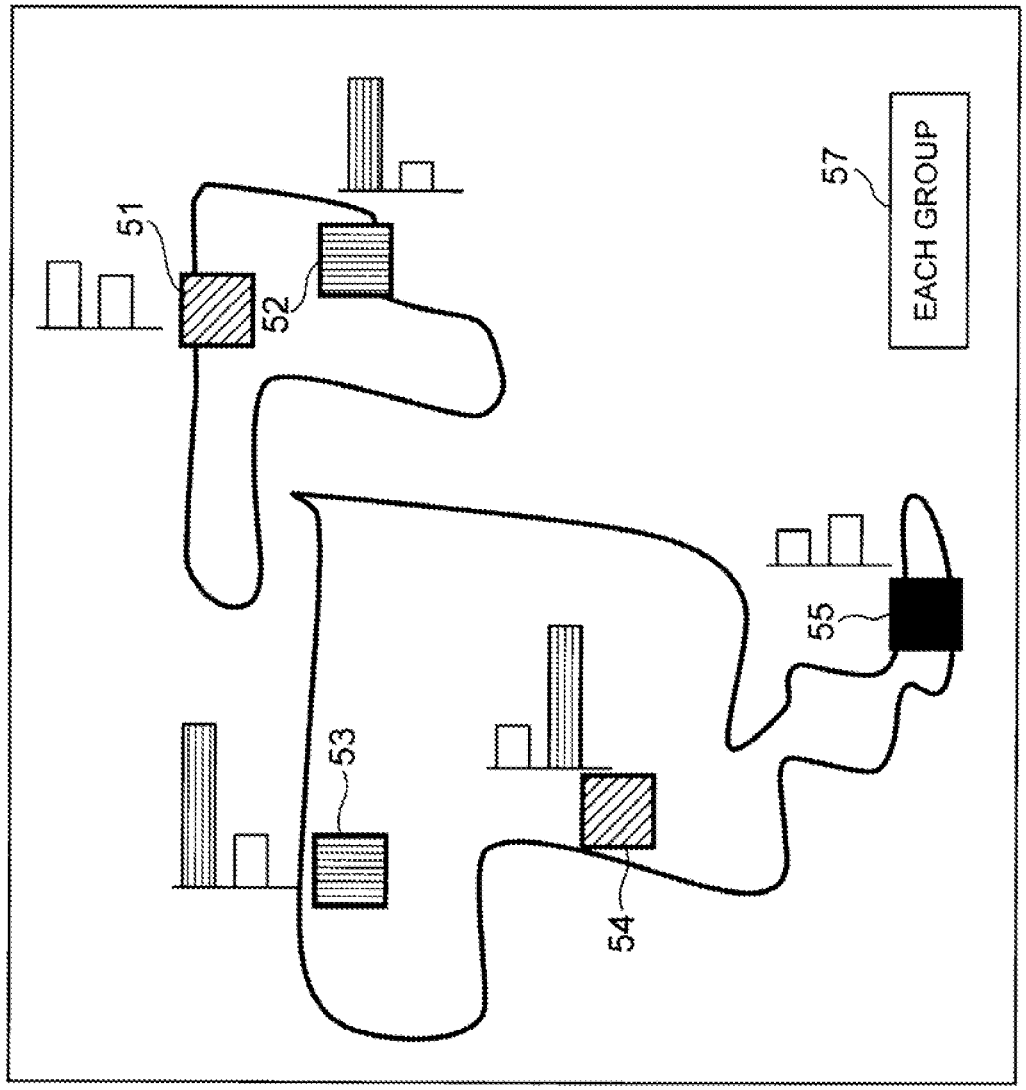
FIG. 14 It depicts a schematic diagram illustrating an example of a screen displayed on the display device by an icon display unit.

FIG. 14 is a schematic diagram illustrating an example of a screen displayed on the display device 209 by the icon display unit 211. The icon display unit 211 superimposes icons 51 to 55 indicating the individual data providing systems 100 on a map image indicated by map data retained in advance, and displays the icons on the display device 209. Although five icons 51 to 55 are illustrated in FIG. 14, the number of icons to be displayed depends on the number of data providing systems 100. The icon display unit 211 reads the positional information of the camera 101 of the data providing system 100 corresponding to the icon from the attribute data storage unit 204, and superimposes the icon at a position indicated by the positional information of the camera 101 on the map image.

In FIG. 14, the icon display unit 211 displays the individual icons 51 to 55 in different patterns for the groups. A case where the patterns of the icons are the same means that the data providing systems 100 indicated by the icons belong to the same group. For example, in the example illustrated in FIG. 14, the data providing systems 100 indicated by the icons 51 and 54 belong to the same group, the data providing systems 100 indicated by the icons 52 and 53 belong to the same group, and the data providing system 100 indicated by the icon 55 belongs to the group different from the other two groups. The icon display unit 211 may display the individual icons in different colors for the groups.

The icon display unit 211 displays the icons on the display device 209, and displays the "number of identification results having low reliability" and the "number of erroneous identifications" acquired from the data providing system 100 corresponding to the icon in the vicinity of each icon on the display device 209. A display mode of the "number of identification results having low reliability" and the "number of erroneous identifications" may not be a mode in which the numerical values are directly displayed. FIG. 14 illustrates a case where the "number of identification results having low reliability" and the "number of erroneous identifications" are displayed in horizontal bar graphs. In the horizontal bar graph corresponding to each icon, for example, an upper bar represents the "number of identification results having low reliability", and a lower bar represents the "number of erroneous identifications". The icon display unit 211 may read the "number of identification results having low reliability" and the "number of erroneous identifications" of each data providing system 100 from the index value storage unit 206, and may determine lengths of the bars based on the values.

When the horizontal bar graphs are displayed on the display device 209 and the "number of identification results having low reliability" is equal to or greater than a predetermined threshold value, the icon display unit 211 emphasizes and displays the bar indicating the "number of identification results having low reliability" in the pattern or color. Similarly, when the "number of erroneous identifications" is equal to or greater than a predetermined threshold value, the icon display unit 211 emphasizes and displays the bar indicating the "number of erroneous identifications" in the pattern or color.

When a screen on which the icons 51 to 55 and the horizontal bar graphs are superimposed on the map image is displayed on the display device 209, the icon display unit 211 displays this screen together with a button 57 (see FIG. 14). An operation when the button 57 is clicked will be described later.

The data request unit 213 transmits the data transmission request to the data providing system 100 designated by the operator of the collection device 200. In the present exemplary embodiment, the operator of the collection device 200 designates the data providing system 100 as a data providing source by clicking the icon (see FIG. 14) indicating the data providing system 100 displayed on the display device 209. That is, in the example illustrated in FIG. 14, when any of the icons 51 to 55 is clicked by the operator, the data request unit 213 transmits the data transmission request to the data providing system 100 corresponding to the clicked icon.

The operator of the collection device 200 may determine the data providing system 100 designated while referring to the bar graphs (that is, the "number of identification results having low reliability" and the "number of erroneous identifications") displayed in the vicinity of the icons.

The data request unit 213 may transmit the data transmission requests to the data providing systems 100 classified into the same group as the data providing systems 100 corresponding to the clicked icons, respectively.

The button 57 is a button for selecting a predetermined number of data providing systems 100 from each group and instructing that the data transmission requests are to be transmitted to the selected data providing systems 100, respectively.

When the button 57 is clicked by the operator of the collection device 200, the selection unit 212 selects a predetermined number of data providing systems 100 for each group while referring to the classification result of the classification unit 207 stored in the classification result storage unit 208. The selection unit 212 may randomly select a predetermined number of data providing systems 100 from each group. Alternatively, when a predetermined number of data providing systems 100 is selected from each group, the selection unit 212 may determine the data providing systems 100 to be selected based on the "number of identification results having low reliability" and the "number of erroneous identifications". The predetermined number may be "1", or may be "2" or more. When the number of data providing systems 100 belonging to a certain group is less than the above-mentioned predetermined number, the selection unit 212 may select each data providing system 100 belonging to the group.

When the selection unit 212 selects a predetermined number of data providing systems 100 for each group by clicking the button 57, the data request unit 213 transmits the data transmission requests to the data providing systems 100 selected by the selection unit 212, respectively.

At a timing at which the transmission request is received, the data transmission unit 113 of the data providing system 100 that receives the transmission request from the data request unit 213 transmits each group of the image determined to be the transmission target data, the label, and the coordinates which are obtained until this point in time to the collection device 200.

When each group of the image, the label, and the coordinates transmitted by the data transmission unit 113 of the data providing system 100 is received, the data reception unit 201 of the collection device 200 stores the received data in the collection-device-side data storage unit 202. This point is similar to the first exemplary embodiment.

The data reception unit 201, the attribute data reception unit 203, the index value reception unit 205, and the data request unit 213 are realized by, for example, the CPU of the computer that operates according to the collection device program and the communication interface of the computer. For example, the CPU may read the collection device program from the program recording medium such as the program storage device of the computer, and may operate as the data reception unit 201, the attribute data reception unit 203, the index value reception unit 205, and the data request unit 213 by using the communication interface according to the collection device program. The classification unit 207, the icon display unit 211, and the selection unit 212 are also realized by, for example, the CPU of the computer that operates according to the collection device program. That is, as described above, the CPU that reads the collection device program may operate as the classification unit 207, the icon display unit 211, and the selection unit 212 according to the collection device program. The collection-device-side data storage unit 202, the attribute data storage unit 204, the index value storage unit 206, and the classification result storage unit 208 are realized by the storage device included in the computer.

Figure 15:
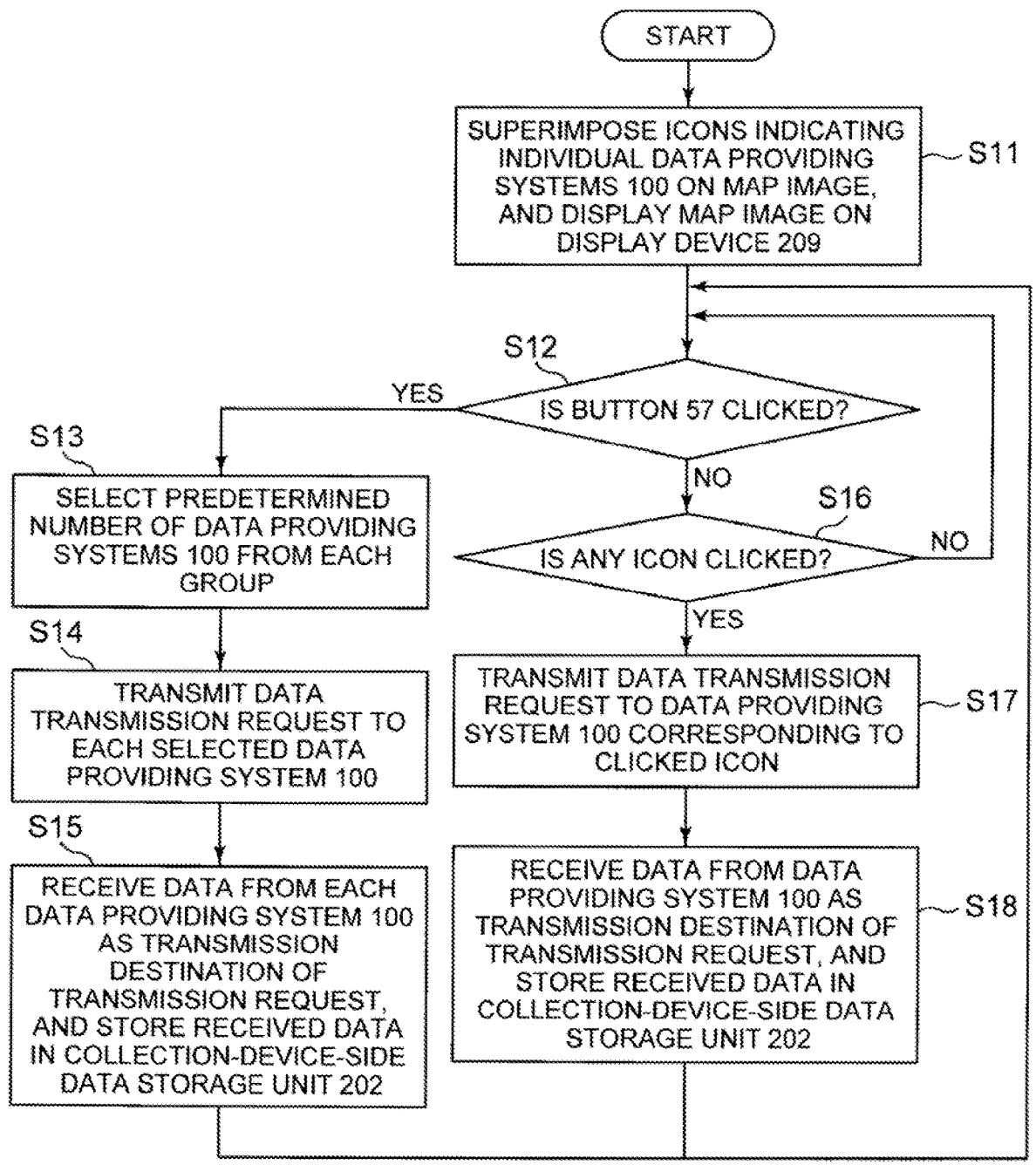
FIG. 15 It depicts a flowchart illustrating an example of a processing progress of the collection device according to the second exemplary embodiment.

Next, a processing progress of the second exemplary embodiment will be described. FIG. 15 is a flowchart illustrating an example of the processing progress of the collection device 200 according to the second exemplary embodiment. Detailed description of the matters already described will be omitted.

It is assumed that each of the individual data providing systems 100 determines the data to be transmitted to the collection device 200 (a set of groups of the image, the label, and the coordinates) in advance. An operation of the data providing system 100 of determining the data to be transmitted to the collection device 200 is the same as that of the first exemplary embodiment, and the description thereof will be omitted.

It is assumed that the attribute data transmission unit 118 of each of the individual data providing systems 100 transmits the attribute data of the camera 101, the identification information of the data providing system 100, and the positional information of the installation location of the camera 101 to the collection device 200. It is assumed that the attribute data reception unit 203 of the collection device 200 receives data from each data providing system 100 and stores the received data in the attribute data storage unit 204. It is assumed that the classification unit 207 classifies the data providing systems 100 into the plurality of groups by using the attribute data of the camera 101 of each data providing system 100 and stores the classification result in the classification result storage unit 208. That is, it is assumed that the data providing systems 100 are classified into the plurality of groups based on the attribute data in advance.

It is assumed that the attribute data transmission unit 118 of each of the individual data providing systems 100 transmits the number of identification results having low reliability and the number of erroneous recognitions to the collection device 200 together with the identification information of the data providing system 100. It is assumed that the index value reception unit 205 of the collection device 200 receives the data from each data providing system 100 and stores the received data in the index value storage unit 206.

First, the icon display unit 211 superimposes the icons indicating the individual data providing systems 100 on the map image indicated by the map data retained in advance and displays the map image on the display device 209 (step S11). In step S11, the icon display unit 211 displays the "number of identification results having low reliability" and the "number of erroneous identifications" acquired from the data providing system 100 corresponding to the icon in the vicinity of each icon on the display device 209. The icon display unit 211 may display the "number of identification results having low reliability" and the "number of erroneous identifications", for example, in the horizontal bar graphs (see FIG. 14). However, display forms of the "number of identification results having low reliability" and the "number of erroneous identifications" are not limited to the horizontal bar graphs. In step S11, the icon display unit 211 displays the above-mentioned button 57 on the display device 209 together with each icon and each horizontal bar graph. In step S11, the screen illustrated in FIG. 14 is displayed.

After step S11, the selection unit 212 determines whether or not the button 57 (see FIG. 14) is clicked by the operator (step S12). When the button 57 is not clicked (No in step S12), the data request unit 213 determines whether or not any one of the icons indicating the data providing system 100 is clicked by the operator (step S16).

When the button 57 is not clicked and any of the icons indicating the data providing system 100 is not clicked (No in step S16), the processing of step S12 and the subsequent steps is repeated.

During this repetition, when the index value counting unit 114 (see FIG. 12) of any of the data providing systems 100 updates the values of the number of identification results having low reliability and the number of erroneous identifications, the index value transmission unit 116 of the data providing system 100 transmits the updated number of identification results having low reliability and the updated number of erroneous identifications together with the identification information of the data providing system 100 to the collection device 200. In this case, the index value reception unit 205 (see FIG. 13) of the collection device 200 receives the data transmitted by the index value transmission unit 116. The index value reception unit 205 updates the number of identification results having low reliability and the number of erroneous identifications corresponding to the data providing system 100 stored in the index value storage unit 206 with the received number of identification results having low reliability and number of erroneous identifications. The icon display unit 211 updates the horizontal bar graphs displayed on the display device 209 based on the updated number of identification results having low reliability and the updated number of erroneous identifications.

When the button 57 is clicked (Yes in step S12), the selection unit 212 selects a predetermined number of data providing systems 100 from each group (step S13).

Subsequently, the data request unit 213 transmits the data transmission requests to the data providing systems 100 selected in step S13, respectively (step S14).

At a timing at which the transmission request is received, the data transmission unit 113 (see FIG. 12) of the data providing system 100 that receives the transmission request from the data request unit 213 transmits each group of the image determined to be the transmission target data, the label, and the coordinates which are obtained until this point in time to the collection device 200.

The data reception unit 201 (see FIG. 13) of the collection device 200 receives the data transmitted by each data providing system 100 which is a transmission destination of the transmission request as described above, and stores the received data in the collection-device-side data storage unit 202 (step S15).

After step S15, for example, the processing of step S12 and the subsequent steps is repeated. Alternatively, the processing may be ended after step S15.

When any one of the icons indicating the data providing systems 100 is clicked (Yes in step S16), the data request unit 213 transmits the data transmission request to the data providing system 100 corresponding to the clicked icon (step S17).

At a timing at which the transmission request is received, the data transmission unit 113 (see FIG. 12) of the data providing system 100 that receives the transmission request from the data request unit 213 transmits each group of the image determined to be the transmission target data, the label, and the coordinates which are obtained until this point in time to the collection device 200.

The data reception unit 201 (see FIG. 13) of the collection device 200 receives the data transmitted by the data providing system 100 that is the transmission destination of the transmission request as described above, and stores the received data to the collection-device-side data storage unit 202 (step S18).

After step S18, for example, the processing of step S12 and the subsequent steps is repeated. Alternatively, the processing may be terminated after step S18.

In the second exemplary embodiment, the collection device 200 can easily collect the data that can contribute to the generation of a model with high identification accuracy as in the first exemplary embodiment.

In the second exemplary embodiment, when the button 57 is clicked, the selection unit 212 selects a predetermined number of data providing systems 100 from each group. The data request unit 213 transmits the data transmission requests to the data providing systems 100 selected by the selection unit 212, respectively. Accordingly, the data reception unit 201 of the collection device 200 can receive the data that can contribute to the generation of the model with high identification accuracy from the data providing systems 100 of each group. A case where the groups are different means that the attributes of the cameras 101 are different. Accordingly, the collection device 200 can collect various kinds of data by collecting the data from the data providing system 100 of each group, and can accumulate the data in the collection-device-side data storage unit 202. Accordingly, the deep learning is performed by using the data accumulated in the collection-device-side data storage unit 202 as the training data, and thus, a highly versatile model that can perform the identification processing with high accuracy on the image regardless of the attributes of the cameras 101 can be generated.

In the first exemplary embodiment and the second exemplary embodiment, a model capable of realizing the identification processing on various images with high accuracy by performing deep learning using the data collected from each data providing system 100 and accumulated in the collection-device-side data storage unit 202 as the training data. This model can be used to generate the model used in the newly provided data providing system 100.

It has been described in each exemplary embodiment that the data providing system 100 transmits the image determined to be the transmission target data by the transmission target data determination unit 111 and the label and the coordinates (coordinates indicating the rectangular region designated by the operator) associated with the image to the collection device 200. The data transmission unit 113 may transmit the model stored in the model storage unit 104 to the collection device 200 instead of these data or together with these data. The data transmission unit 113 may transmit a feature value obtained when the model is generated to the collection device 200. The feature value obtained when the model is generated is intermediate data generated by the learning unit 103 in the process of generating the model by deep learning. The learning unit 103 may store the above-described feature value in the model storage unit 104 when the model is learned. In this case, the model or the feature value of each data providing system 100 is accumulated in the collection-device-side data storage unit 202 of the collection device 200. From such a model or feature value, the model that can realize the identification processing on various images with high accuracy can be generated.

It has been described in each exemplary embodiment that the data collection unit 101 is the camera and the camera collects the images. The data collection unit 101 is not limited to the camera. For example, the data collection unit 101 may be a microphone, and the microphone may collect audio data. In this case, when the label reception unit 110 displays the screens illustrated in FIGS. 5, 6, and 8 on the display device 109, audio based on the audio data is output from a speaker (not illustrated) instead of displaying the image 301.

Figure 16:
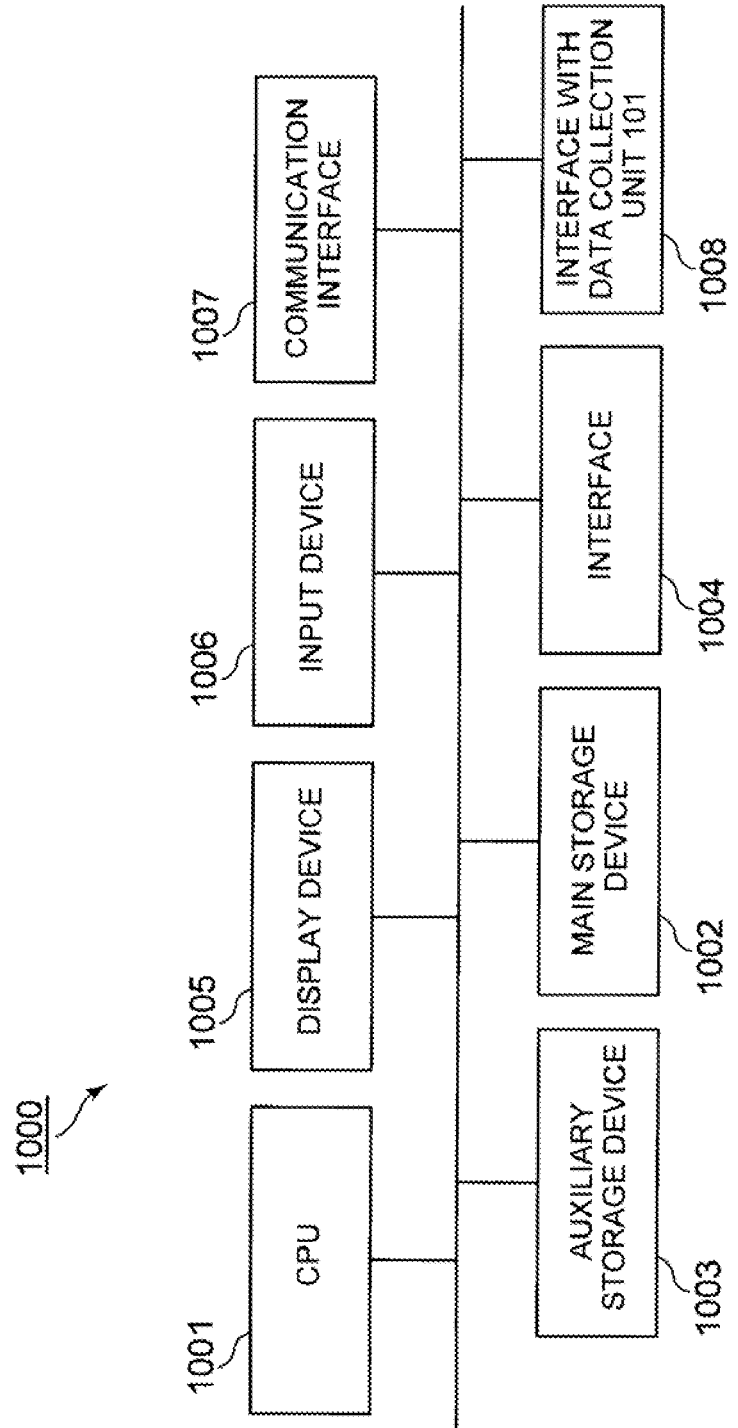
FIG. 16 It depicts a schematic block diagram illustrating a configuration example of a computer included in the data providing system according to each exemplary embodiment of the present invention.

FIG. 16 is a schematic block diagram illustrating a configuration example of the computer 102 included in the data providing system 100 according to each exemplary embodiment of the present invention. In FIG. 16, the computer is denoted by a reference sign "1000". A computer 1000 includes a CPU 1001, a main storage device 1002, an auxiliary storage device 1003, an interface 1004, a display device 1005, an input device 1006, a communication interface 1007, and an interface 1008 with the data collection unit 101 (for example, the camera).

The operation of the computer included in the data providing system 100 is stored in the auxiliary storage device 1003 in the form of the data providing program. The CPU 1001 reads the data providing program from the auxiliary storage device 1003, and expands the read program in the main storage device 1002. The CPU 1001 executes the processing of the computer 102 (see FIGS. 2 and 12) illustrated in each exemplary embodiment according to the data providing program.

The auxiliary storage device 1003 is an example of a non-transitory tangible medium. As another example of the non-transitory tangible medium, there are a magnetic disk, a magneto-optical disk, a compact disk read only memory (CD-ROM), a digital versatile disk read only memory (DVD-ROM), a semiconductor memory, and the like connected via the interface 1004. When this program is distributed to the computer 1000 via a communication line, the computer 1000 to which the program is distributed may expand the program in the main storage device 1002 and execute the above-described processing.

The program may be used for realizing a part of the processing of the computer 102 illustrated in each exemplary embodiment. The program may be a differential program that realizes the above-described processing in combination with another program already stored in the auxiliary storage device 1003.

A part or all of the constituent components may be realized by a general-purpose or dedicated circuitry, a processor, or a combination thereof. These constituent components may be realized by a single chip, or may be realized by a plurality of chips connected via a bus. A part or all of the constituent components may be realized by a combination of the above-described circuits and a program.

When a part or all of the constituent components are realized by a plurality of information processing devices, circuits, and the like, the plurality of information processing devices, circuits, and the like may be centrally arranged or may be distributedly arranged. For example, the information processing device, the circuit, and the like may be realized as a form in which a client and server system, a cloud computing system, and the like are connected to each other via a communication network.

The collection device 200 illustrated in each exemplary embodiment is mounted on the same computer as the computer 1000 illustrated in FIG. 16. However, the interface 1008 with the data collection unit 101 may not be provided in the computer on which the collection device 200 is mounted. In this case, the operation of the collection device 200 is stored in the auxiliary storage device 1003 in the form of the collection device program. The CPU 1001 reads the collection device program from the auxiliary storage device 1003, expands the read program in the main storage device 1002, and executes the processing of the collection device 200 illustrated in each exemplary embodiment according to the collection device program.

Although the configuration of the computer 102 included in the data providing system 100 and the configuration of the collection device 200 have been described with reference to FIG. 16, each computer 102 included in each data providing system 100 and the collection devices 200 are each separate computers.

Figure 17:
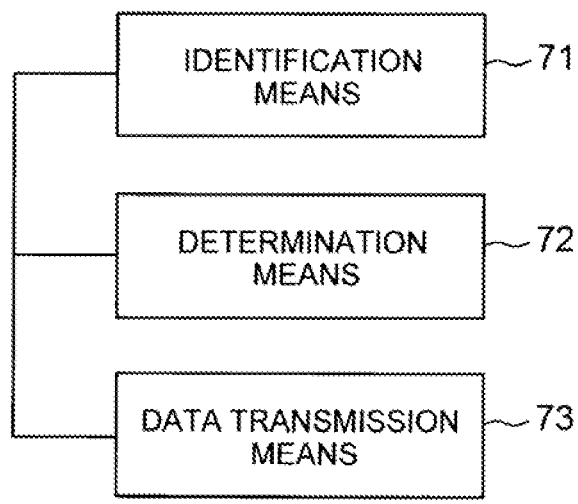
FIG. 17 It depicts a block diagram illustrating an example of an outline of the data providing system of the present invention.

Next, an outline of the present invention will be described. FIG. 17 is a block diagram illustrating an example of an outline of the data providing system of the present invention. The data providing system of the present invention includes identification means 71, determination means 72, and data transmission means 73.

The identification means 71 (for example, the identification unit 106) identifies the object indicated by the data by applying the data (for example, image) to the model learned by machine learning.

The determination means 72 (for example, the transmission target data determination unit 111) determines whether or not the data is the transmission target data to be transmitted to a predetermined computer (for example, the collection device 200) based on the result obtained by applying the data to the model.

The data transmission means 73 (for example, the data transmission unit 113) transmits the data determined to be the transmission target data to the predetermined computer at a predetermined timing.

With such a configuration, it is possible to easily collect the data that can contribute to the generation of the model with high identification accuracy.

Figure 18:
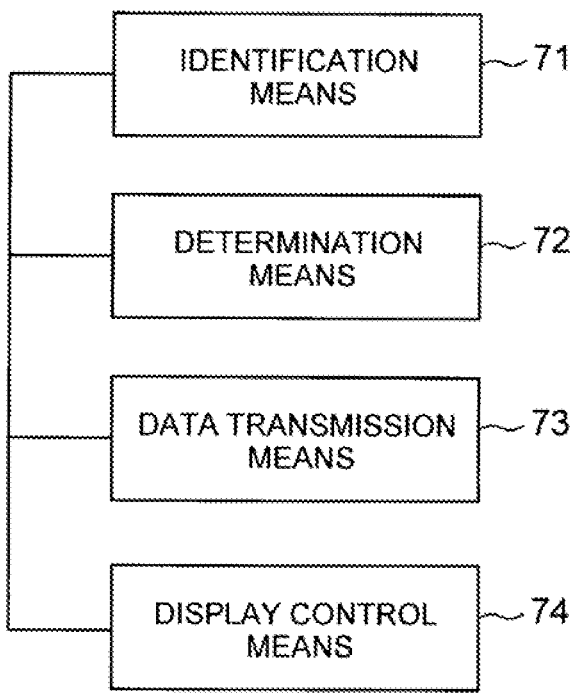
FIG. 18 It depicts a block diagram illustrating another example of the outline of the data providing system of the present invention.

FIG. 18 is a block diagram illustrating another example of the outline of the data providing system of the present invention. The data providing system illustrated in FIG. 18 includes identification means 71, determination means 72, data transmission means 73, and display control means 74. The identification means 71 and the determination means 72 are the same as the identification means 71 and the determination means 72 illustrated in FIG. 17, and thus, the description thereof will be omitted.

The display control means 74 (for example, the display control unit 115) displays a button for inputting a data transmission instruction together with index values indicating the identification accuracy of the model (for example, the number of identification results having low reliability or the number of erroneous identifications) (for example, the transmission instruction button 41 illustrated in FIG. 9).

The data transmission means 73 (for example, the data transmission unit 113) transmits each data determined to be the transmission target data to a predetermined computer (for example, the collection device 200) at a timing at which the button is clicked by the operator.

With such a configuration, it is possible to easily collect the data that can contribute to the generation of the model with high identification accuracy.

Figure 19:
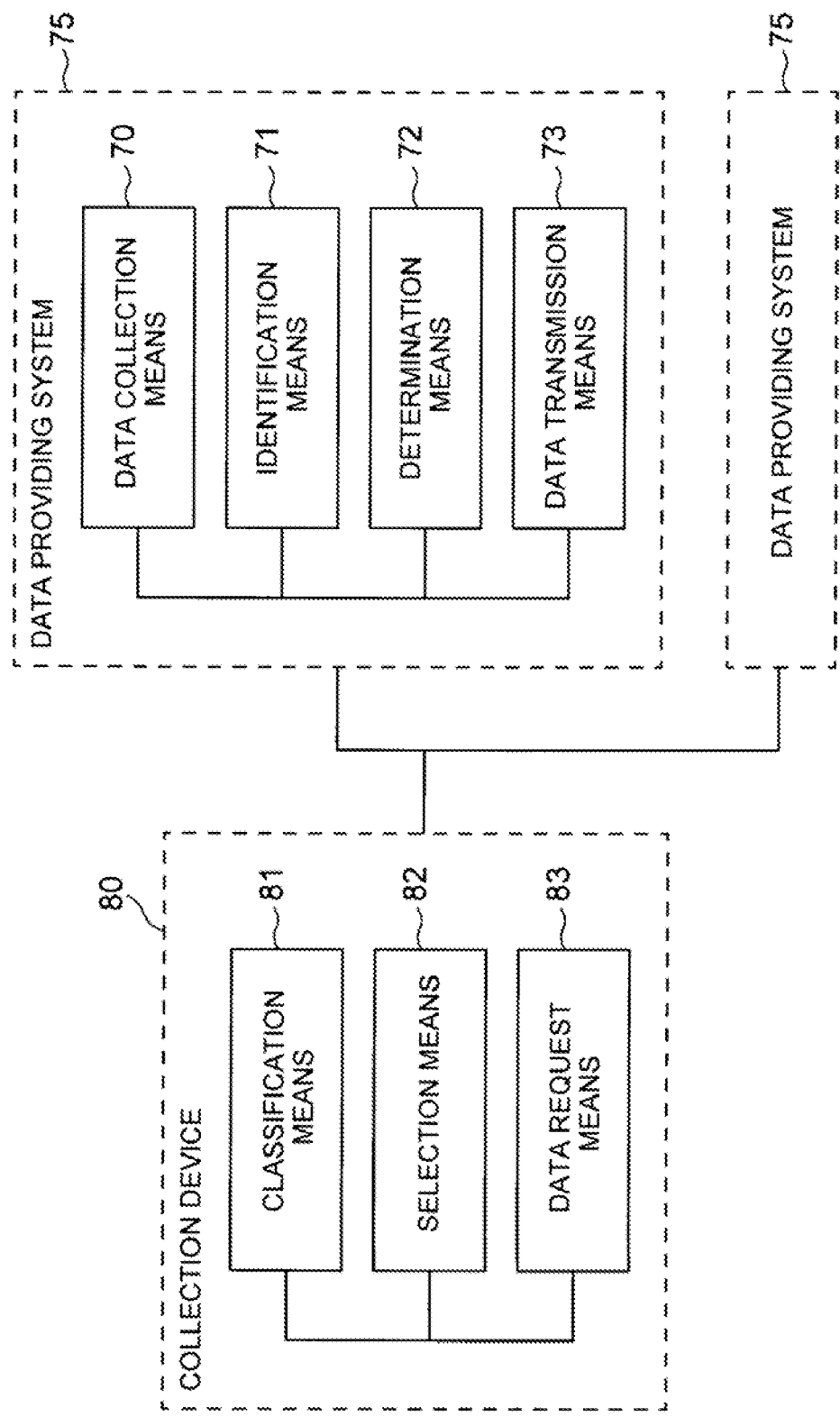
FIG. 19 It depicts a block diagram illustrating an example of an outline of the data collection system of the present invention.

FIG. 19 is a block diagram illustrating an example of an outline of the data collection system of the present invention. The data collection system of the present invention includes a plurality of data providing systems 75 (for example, the data providing system 100) and a collection device 80 (for example, a collection device 200) that collects data from the plurality of data providing systems 75.

Each of the individual data providing systems 75 includes data collection means 70, identification means 71, determination means 72, and data transmission means 73.

The data collection means 70 (for example, the camera) collects data (for example, an image) at the installation location.

The identification means 71 (for example, the identification unit 106) identifies the object indicated by the data by applying the data collected by the data collection means 70 to the model learned by machine learning.

The determination means 72 (for example, the transmission target data determination unit 111) determines whether or not the data is the transmission target data to be transmitted to the collection device 80 (for example, the collection device 200) based on the result obtained by applying the data to the model.

The data transmission means 73 (for example, the data transmission unit 113) transmits the data determined to be the transmission target data to the collection device 80.

The collection device 80 includes classification means 81, selection means 82, and data request means 83.

The classification means 81 (for example, the classification unit 207) classifies the data providing systems 75 into a plurality of groups based on attributes of the data collection means 70 of the individual data providing systems.

The selection means 82 (for example, the selection unit 212) selects the data providing systems 75 from each group when the operator of the collection device 80 performs a predetermined operation.

The data request means 83 (for example, the data request unit 213) transmits data transmission requests to the data providing systems 75 selected by the selection means 82.

The data transmission means 73 of each of the individual data providing systems 75 transmits each data determined to be the transmission target data to the collection device 80 at a timing at which the transmission request is received from the collection device 80.

With such a configuration, it is possible to easily collect the data that can contribute to the generation of the model with high identification accuracy.

FIG. 20 is a block diagram illustrating another example of the outline of the data collection system of the present invention. The data collection system illustrated in FIG. 20 includes the plurality of data providing systems 75 (for example, the data providing systems 100) and the collection device 80 (for example, the collection device 200) that collects data from the plurality of data providing systems 75.

Each of the individual data providing systems 75 includes the data collection means 70, the identification means 71, the determination means 72, the data transmission means 73, and index value transmission means 77. The data collection means 70, the identification means 71, the determination means 72 and the data transmission means 73 are the same as the data collection means 70, the identification means 71, the determination means 72 and the data transmission means 73 illustrated in FIG. 19.

The index value transmission means 77 (for example, the index value transmission unit 116) transmits the index values indicating the identification accuracy of the model (for example, the number of identification results having low reliability and the number of erroneous identifications) to the collection device 80.

The collection device 80 includes the classification means 81, icon display means 84, and the data request means 83. The classification means 81 is the same as the classification means 81 illustrated in FIG. 19, and the description thereof will be omitted.

The icon display means 84 (for example, the icon display unit 211) displays the icons (for example, the icons 51 to 55 illustrated in FIG. 14) indicating the individual data providing systems 75 in different modes for the groups, and displays the index values received from the data providing systems 75 indicated by the icons in the vicinity of the icons.

When the operator of the collection device 80 clicks the icon, the data request means 83 (data request unit 213) transmits the data transmission request to the data providing system 75 indicated by the clicked icon.

The data transmission means 73 of each of the individual data providing systems 75 transmits each data determined to be the transmission target data to the collection device 80 at a timing at which the transmission request is received from the collection device 80.

With such a configuration, it is possible to easily collect the data that can contribute to the generation of the model with high identification accuracy.

The above-described exemplary embodiments of the present invention can be described as, but not limited thereto, the following appendices.

(Supplementary Note 1)
A data providing system including
identification means for identifying an object indicated by data by applying the data to a model learned by machine learning,
determination means for determining whether or not the data is transmission target data to be transmitted to a predetermined computer based on a result obtained by applying the data to the model, and
data transmission means for transmitting the data determined to be the transmission target data to the predetermined computer at a predetermined timing.

(Supplementary Note 2)
The data providing system according to supplementary note 1,
in which the identification means derives an identification result of the object and a reliability of the identification result, and
the determination means determines that the data is the transmission target data when the reliability is equal to or less than a predetermined threshold value.

(Supplementary Note 3)
The data providing system according to supplementary note 1 or supplementary note 2,
in which the determination means transmits data and a signal for requesting that an identification result of an object for the data is to be transmitted, to a different data providing system, and determines that the data is the transmission target data when a result identified by the identification means and the identification result sent back from the different data providing system are different from each other.

(Supplementary Note 4)
The data providing system according to any one of supplementary note 1 to supplementary note 3,
in which the determination means presents data and a result identified by the identification means to an operator, and determines that the data is the transmission target data when information indicating that the data is the transmission target data is input from the operator.

(Supplementary Note 5)
The data providing system according to any one of supplementary note 1 to supplementary note 4,
in which, at a timing at which a capacity of each data determined to be the transmission target data is equal to or greater than a predetermined capacity, the data transmission means transmits the each data to the predetermined computer.

(Supplementary Note 6)
The data providing system according to any one of supplementary note 1 to supplementary note 5,
in which the data transmission means transmits each data determined to be the transmission target data to the predetermined computer at a predetermined time.

(Supplementary Note 7)
The data providing system according to any one of supplementary note 1 to supplementary note 6,
in which the data transmission means transmits each data determined to be the transmission target data to the predetermined computer at a timing at which an erroneous identification rate obtained for each fixed period is equal to or greater than a predetermined threshold value.

(Supplementary Note 8)
The data providing system according to any one of supplementary note 1 to supplementary note 7,
in which, at a timing at which an instruction to transmit each data determined to be the transmission target data is received from an operator, the data transmission means transmits the each data to the predetermined computer.

(Supplementary Note 9)
The data providing system according to any one of supplementary note 1 to supplementary note 8, further including
display control means for displaying a button for inputting a data transmission instruction and an index value indicating identification accuracy of the model,
in which the data transmission means transmits each data determined to be the transmission target data to the predetermined computer at a timing at which the button is clicked by the operator.

(Supplementary Note 10)

The data providing system according to any one of supplementary note 1 to supplementary note 9, in which the data transmission means transmits each data determined to be the transmission target data to the predetermined computer at a timing at which a data transmission request is received from the predetermined computer.

(Supplementary Note 11)

The data providing system according to any one of supplementary note 1 to supplementary note 10, in which the data is an image, and the identification means identifies an object included in the image.

(Supplementary Note 12)

A data providing system including identification means for identifying an object indicated by data by applying the data to a model learned by machine learning, determination means for determining whether or not the data is transmission target data to be transmitted to a predetermined computer based on a result obtained by applying the data to the model, data transmission means for transmitting the data determined to be the transmission target data to the predetermined computer, and display control means for displaying a button for inputting a data transmission instruction and an index value indicating identification accuracy of the model, in which the data transmission means transmits each data determined to be the transmission target data to the predetermined computer at a timing at which the button is clicked by an operator.

(Supplementary Note 13)

A data collection system including a plurality of data providing systems, and a collection device that collects data from the plurality of data providing systems, in which each of the individual data providing systems includes data collection means for collecting data at an installation location, identification means for identifying an object indicated by the data collected by the data collection means by applying the data to a model learned by machine learning, determination means for determining whether or not the data is transmission target data to be transmitted to the collection device based on a result obtained by applying the data to the model, and data transmission means for transmitting the data determined to be the transmission target data to the collection device, the collection device includes classification means for classifying the data providing systems into a plurality of groups based on an attribute of the data collection means of each of the individual data providing systems, selection means for selecting the data providing systems from each group when an operator of the collection device performs a predetermined operation, and data request means for transmitting a data transmission request to each of the data providing systems selected by the selection means, and wherein the data transmission means of each of the individual data providing systems transmits each data determined to be the transmission target data to the collection device at a timing at which the transmission request is received from the collection device.

(Supplementary Note 14)

The data collection system according to supplementary note 13, in which each of the individual data providing systems further includes index value transmission means for transmitting an index value indicating identification accuracy of the model to the collection device, the collection device further includes icon display means for displaying icons indicating the individual data providing systems in different modes for the groups, and displaying the index value received from the data providing system indicated by the icon in the vicinity of each of the individual icons, and when the icon is clicked by the operator of the collection device, the data request means transmits the data transmission request to the data providing system indicated by the clicked icon.

(Supplementary Note 15)

A data collection system including a plurality of data providing systems, and a collection device that collects data from the plurality of data providing systems, in which each of the individual data providing systems includes data collection means for collecting data at an installation location, identification means for identifying an object indicated by the data collected by the data collection means by applying the data to a model learned by machine learning, determination means for determining whether or not the data is transmission target data to be transmitted to the collection device based on a result obtained by applying the data to the model, data transmission means for transmitting the data determined to be the transmission target data to the collection device, and index value transmission means for transmitting an index value indicating identification accuracy of the model to the collection device, the collection device includes classification means for classifying the data providing systems into a plurality of groups based on an attribute of the data collection means of each of the individual data providing systems, icon display means for displaying icons indicating the individual data providing systems in different modes for the groups, and displaying the index value received from the data providing system indicated by the icon in the vicinity of each of the individual icons, and data request means for transmitting, when the icon is clicked by an operator of the collection device, a data transmission request to the data providing system indicated by the clicked icon, and wherein the data transmission means of each of the individual data providing systems transmits each data determined to the transmission target data to the collection device at a timing at which the transmission request is received from the collection device.

(Supplementary Note 16)

A data providing method including identifying an object indicated by data by applying the data to a model learned by machine learning, determining whether or not the data is transmission target data to be transmitted to a predetermined computer based on a result obtained by applying the data to the model, and transmitting the data determined to be the transmission target data to the predetermined computer at a predetermined timing.

(Supplementary Note 17)

A data collection method applied to a data collection system that includes a plurality of data providing systems each including data collection means for collecting data at an installation location and a collection device collecting data from the plurality of data providing systems, the data collection method including identifying, by each of the individual data providing systems, an object indicated by the data collected by the data collection means by applying the data to a model learned by machine learning, determining, by each of the individual data providing systems, whether or not the data is transmission target data to be transmitted to the collection device based on a result obtained by applying the data to the model, classifying, by the collection device, the data providing systems into a plurality of groups based on an attribute of the data collection means of each of the individual data providing systems, selecting, by the collection device, the data providing systems from each group when an operator of the collection device performs a predetermined operation, transmitting, by the collection device, a data transmission request to each of the selected data providing systems, and transmitting, by each of the individual data providing systems, each data determined to be the transmission target data to the collection device at a timing at which the transmission request is received from the collection device.

(Supplementary Note 18)

A data providing program causing a computer to execute identification processing of identifying an object indicated by data by applying the data to a model learned by machine learning, determination processing of determining whether or not the data is transmission target data to be transmitted to a predetermined computer based on a result obtained by applying the data to the model, and data transmission processing of transmitting the data determined to be the transmission target data to the predetermined computer at a predetermined timing.

Although the present invention has been described with reference to the exemplary embodiments, the present invention is not limited to the above-described exemplary embodiments. Various modifications that can be understood by those skilled in the art can be made to the configurations and details of the present invention within the scope of the present invention.

INDUSTRIAL APPLICABILITY

The present invention is preferably applied to the collection of the data as the training data.

REFERENCE SIGNS LIST

100 Data providing system
101 Data collection unit
102 Computer
103 Learning unit
104 Model storage unit
105 Data acquisition unit
106 Identification unit
107 Keyboard
108 Mouse
109 Display device
110 Label reception unit
111 Transmission target data determination unit
112 Data storage unit
113 Data transmission unit
114 Index value counting unit
115 Display control unit
116 Index value transmission unit
117 Attribute data storage unit
118 Attribute data transmission unit
200 Collection device
201 Data reception unit
202 Collection-device-side data storage unit
203 Attribute data reception unit
204 Attribute data storage unit
205 Index value reception unit
206 Index value storage unit
207 Classification unit
208 Classification result storage unit
209 Display device
210 Mouse
211 Icon display unit
212 Selection unit
213 Data request unit

The invention claimed is:

1. A data providing system comprising:
an identification unit that identifies an object indicated by data by applying the data to a model learned by machine learning;
a determination unit that determines whether or not the data is transmission target data to be transmitted to a predetermined computer based on a result obtained by applying the data to the model; and
a data transmission unit that transmits the data determined to be the transmission target data to the predetermined computer at a predetermined timing.

2. The data providing system according to claim 1,
wherein the identification unit derives an identification result of the object and a reliability of the identification result, and
the determination unit determines that the data is the transmission target data when the reliability is equal to or less than a predetermined threshold value.

3. The data providing system according to claim 1,
wherein the determination unit transmits data and a signal for requesting that an identification result of an object for the data is to be transmitted, to a different data providing system, and determines that the data is the transmission target data when a result identified by the identification unit and the identification result sent back from the different data providing system are different from each other.

4. The data providing system according to claim 1,
wherein the determination unit presents data and a result identified by the identification unit to an operator, and determines that the data is the transmission target data when information indicating that the data is the transmission target data is input from the operator.

5. The data providing system according to claim 1,
wherein, at a timing at which a capacity of each data determined to be the transmission target data is equal to or greater than a predetermined capacity, the data transmission unit transmits the each data to the predetermined computer.

6. The data providing system according to claim 1,
wherein the data transmission unit transmits each data determined to be the transmission target data to the predetermined computer at a predetermined time.

7. The data providing system according to claim 1,
wherein the data transmission unit transmits each data determined to be the transmission target data to the predetermined computer at a timing at which an erroneous identification rate obtained for each fixed period is equal to or greater than a predetermined threshold value.

8. The data providing system according to claim 1,
wherein, at a timing at which an instruction to transmit each data determined to be the transmission target data is received from an operator, the data transmission unit transmits the each data to the predetermined computer.

9. The data providing system according to claim 1, further comprising:
a display control unit that displays a button for inputting a data transmission instruction and an index value indicating identification accuracy of the model,
wherein the data transmission unit transmits each data determined to be the transmission target data to the predetermined computer at a timing at which the button is clicked by the operator.

10. The data providing system according to claim 1,
wherein the data transmission unit transmits each data determined to be the transmission target data to the predetermined computer at a timing at which a data transmission request is received from the predetermined computer.

11. The data providing system according to claim 1,
wherein the data is an image, and
the identification unit identifies an object included in the image.

12. A data providing method comprising:
identifying an object indicated by data by applying the data to a model learned by machine learning;
determining whether or not the data is transmission target data to be transmitted to a predetermined computer based on a result obtained by applying the data to the model; and
transmitting the data determined to be the transmission target data to the predetermined computer at a predetermined timing.

13. A non-transitory computer-readable recording medium in which a data providing program is recorded, the data providing program causing a computer to execute:
identification processing of identifying an object indicated by data by applying the data to a model learned by machine learning;
determination processing of determining whether or not the data is transmission target data to be transmitted to a predetermined computer based on a result obtained by applying the data to the model; and
data transmission processing of transmitting the data determined to be the transmission target data to the predetermined computer at a predetermined timing.

* * * * *